United States Patent
Rugeland et al.

(10) Patent No.: US 12,144,054 B2
(45) Date of Patent: Nov. 12, 2024

(54) HANDLING OF IDLE MEASUREMENT RESULTS IN RRC_CONNECTED

(71) Applicant: Telefonaktiebolaget LM Ericsson (publ), Stockholm (SE)

(72) Inventors: Patrik Rugeland, Stockholm (SE); Icaro Leonardo Da Silva, Solna (SE); Oumer Teyeb, Montréal (CA); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 17/621,425

(22) PCT Filed: Jun. 24, 2020

(86) PCT No.: PCT/SE2020/050651
§ 371 (c)(1),
(2) Date: Dec. 21, 2021

(87) PCT Pub. No.: WO2020/263165
PCT Pub. Date: Dec. 30, 2020

(65) Prior Publication Data
US 2022/0394806 A1 Dec. 8, 2022

Related U.S. Application Data

(60) Provisional application No. 62/866,366, filed on Jun. 25, 2019.

(51) Int. Cl.
*H04W 24/10* (2009.01)
*H04W 76/19* (2018.01)
*H04W 76/27* (2018.01)

(52) U.S. Cl.
CPC ........... *H04W 76/27* (2018.02); *H04W 24/10* (2013.01); *H04W 76/19* (2018.02)

(58) Field of Classification Search
CPC ...... H04L 5/001; H04L 5/0098; H04W 24/10; H04W 36/0058; H04W 36/30;
(Continued)

(56) References Cited

U.S. PATENT DOCUMENTS 10,531,326 B2 * 1/2020 Hong .................... H04W 72/23
11,129,041 B2 * 9/2021 Chen .................... H04W 76/11
(Continued)

FOREIGN PATENT DOCUMENTS

KR 20190012096 A 2/2019
WO 2010146468 A2 12/2010

OTHER PUBLICATIONS

3GPP, "3rd Generation Partnership Project; Technical Specification Group Radio Access Network; NR; Physical layer procedures for control (Release 15)", 3GPP TS 38.213 V15.6.0, Jun. 2019, pp. 1-107.
(Continued)

*Primary Examiner* — Frank Duong
(74) *Attorney, Agent, or Firm* — Murphy, Bilak & Homiller, PLLC

(57) ABSTRACT

In one aspect, a wireless device is adapted to perform idle mode measurements. The wireless device performs and stores one or more radio signal measurements while in an idle mode or inactive state. The wireless device also deletes the stored radio signal measurements in response to any one of a number of events, such as receiving a RRC release message that does not include an idle mode measurement configuration, receiving an RRC release message while in RRC Connected state, receiving a handover message, or receiving a reconfiguration message adding a secondary cell for carrier aggregation.

11 Claims, 13 Drawing Sheets

(58) Field of Classification Search
CPC . H04W 36/304; H04W 72/12; H04W 72/542; H04W 72/543; H04W 72/56; H04W 76/19; H04W 76/27
See application file for complete search history.

(56) References Cited

U.S. PATENT DOCUMENTS 11,546,790 B2 * 1/2023 Jung .................... H04L 5/0094
2019/0037425 A1 1/2019 Hong et al.

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304 V15.3.0, Mar. 2019, pp. 1-55.

3GPP, "3GPP TS 36.321 V15.6.0", 3rd Generation Partnership Project; Technical Specification Group Radio Access Network; Evolved Universal Terrestrial Radio Access (E-UTRA); Medium Access Control (MAC) protocol specification (Release 15), Jun. 2019, pp. 1-133.

3GPP, "3GPP TS 36.523-1 V16.1.0 8 RRC—8.1 RRC connection management pro", 3rd Generation Partnership Project; Technical Specification Group Radio Access Network; Evolved Universal Terrestrial Radio Access (E-UTRA) and Evolved Packet Core (EPC); User Equipment (UE) conformance specification;, Jun. 2019, pp. 1-557.

3GPP, "3rd Generation Partnership Project; Technical Specification Group Core Network and Terminals; Non-Access-Stratum (NAS) functions related to Mobile Station (MS) in idle mode (Release 16)", 3GPP TS 23.122 V16.2.0, Jun. 2019, pp. 1-72.

3GPP, "3rd Generation Partnership Project; Technical Specification Group Core Network and Terminals; Non-Access-Stratum (NAS) protocol for Evolved Packet System (EPS); Stage 3 (Release 15)", 3GPP TS 24.301 V15.5.0, Dec. 2018, pp. 1-536.

3GPP, "3rd Generation Partnership Project; Technical Specification Group Core Network and Terminals; Non-Access-Stratum (NAS) protocol for 5G System (5GS); Stage 3 (Release 15)", 3GPP TS 24.501 V15.1.0, Sep. 2018, pp. 1-398.

3GPP, "3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.3.0, Mar. 2019, pp. 1-52.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, pp. 1-238.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.1, Apr. 2019, pp. 1-948.

3GPP, "3rd Generation Partnership Project; Technical Specification Group Radio Access Network; Evolved Universal Terrestrial Radio Access (E-UTRA); Requirements for support of radio resource management (Release 16)", 3GPP TS 36.133 V16.1.0, Mar. 2019, pp. 1-3583.

3GPP, "3rd Generation Partnership Project; Technical Specification Group Radio Access Network; NR; Radio Resource Control (RRC) protocol specification (Release 15)", 3GPP TS 38.331 V15.5.1, Apr. 2019, pp. 1-491.

Nokia, et al., "Addition of idle mode measurement testcase with measurement info from measIdleConfig", 3GPP TSG-WG5 Meeting #83, R5-195205, Reno, USA, May 13-17, 2019, pp. 1-7.

Vivo, "Consideration on IDLE Measurement across Cells", WGPP TSG RAN WG2 Meeting #101, R2-1802007, Athens, Greece, Feb. 26-Mar. 2, 2018, pp. 1-2.

* cited by examiner

| RRCConnectionReconfiguration field descriptions |
|---|
| sCellConfigCommon<br>Indicates the common configuration for the SCell group. |
| sCellGroupIndex<br>Indicates the identity of SCell groups for which a common configuration is provided. |
| sCellIndex<br>In case of DC, the SCellIndex is unique within the scope of the UE i.e. an SCG cell cannot use the same value as used for an MCG cell. For *pSCellToAddMod*, if *sCellIndex-r13* is present the UE shall ignore *sCellIndex-r12*. *sCellIndex-r13* in *sCellToAddModListExt-r13* shall not have same values as sCellIndex-r10 in sCellToAddModList-r10. |
| sCellGroupToAddModList, sCellGroupToAddModListSCG<br>Indicates the SCell group to be added or modified. E-UTRAN only configures at most 4 SCell groups per UE over all cell groups. |
| sCellGroupToReleaseList<br>Indicates the SCell group to be released. |
| sCellState<br>A one-shot field that indicates whether the SCell shall be considered to be in activated or dormant state upon SCell configuration. |
| sCellToAddModList, sCellToAddModListExt<br>Indicates the SCell to be added or modified. Field *sCellToAddModList* is used to add the first 4 SCells for a UE with *sCellIndex-r10* while *sCellToAddModListExt* is used to add the rest. If E-UTRAN includes *sCellToAddModListExt-v1430* it includes the same number of entries, and listed in the same order, as in *sCellToAddModListExt-r13*. If E-UTRAN includes *sCellToAddModList-v10l0* it includes the same number of entries, and listed in the same order, as in *sCellToAddModList-r10*. If E-UTRAN includes *sCellToAddModListExt-v1370* it includes the same number of entries, and listed in the same order, as in *sCellToAddModListExt-r13*. If E-UTRAN includes *sCellToAddModListExt-v13c0* it includes the same number of entries, and listed in the same order, as in *sCellToAddModListExt-r13*. |
| sCellToAddModListSCG, sCellToAddModListSCG-Ext<br>Indicates the SCG cell to be added or modified. The field is used for SCG cells other than the PSCell (which is added/ modified by field *pSCellToAddMod*). Field *sCellToAddModListSCG* is used to add the first 4 SCells for a UE with *sCellIndex-r10* while *sCellToAddModListSCG-Ext* is used to add the rest. If E-UTRAN includes *sCellToAddModListSCG-v10l0* it includes the same number of entries, and listed in the same order, as in *sCellToAddModListSCG-r12*. If E-UTRAN includes *sCellToAddModListSCG-Ext-v1370* it includes the same number of entries, and listed in the same order, as in *sCellToAddModListSCG-Ext-r13*. If E-UTRAN includes *sCellToAddModListSCG-Ext-v13c0* it includes the same number of entries, and listed in the same order, as in *sCellToAddModListSCG-Ext-r13*. |
| sCellToReleaseListSCG, sCellToReleaseListSCG-Ext<br>Indicates the SCG cell to be released. The field is also used to release the PSCell, e.g., upon change of PSCell, upon system information change for the PSCell. |

FIG. 4

| MeasIdleConfig field descriptions |
|---|
| allowedMeasBandwidth<br>If absent, the value corresponding to the downlink bandwidth indicated by the *dl-Bandwidth* included in *MasterInformationBlock* of serving cell applies. |
| carrierFreq<br>Indicates the E-UTRA carrier frequency to be used for measurements during IDLE mode. |
| measIdleCarrierListEUTRA<br>Indicates the E-UTRA carriers to be measured during IDLE mode. |
| measIdleDuration<br>Indicates the duration for performing measurements during IDLE mode for measurements assigned via *RRCConnectionRelease*. Value sec10 correspond to 10 seconds, value sec30 to 30 seconds and so on. |
| qualityThreshold<br>Indicates the quality thresholds for reporting the measured cells for IDLE mode measurements. |
| reportQuantities<br>Indicates which measurement quantities UE is requested to report in the IDLE mode measurement report. |
| measCellList<br>Indicates the list of cells which the UE is requested to measure and report for IDLE mode measurements. |
| validityArea<br>Indicates the list of cells within which UE is requested to do IDLE mode measurements. If the UE reselects to a cell outside this list, the measurements are no longer required. |

FIG. 5

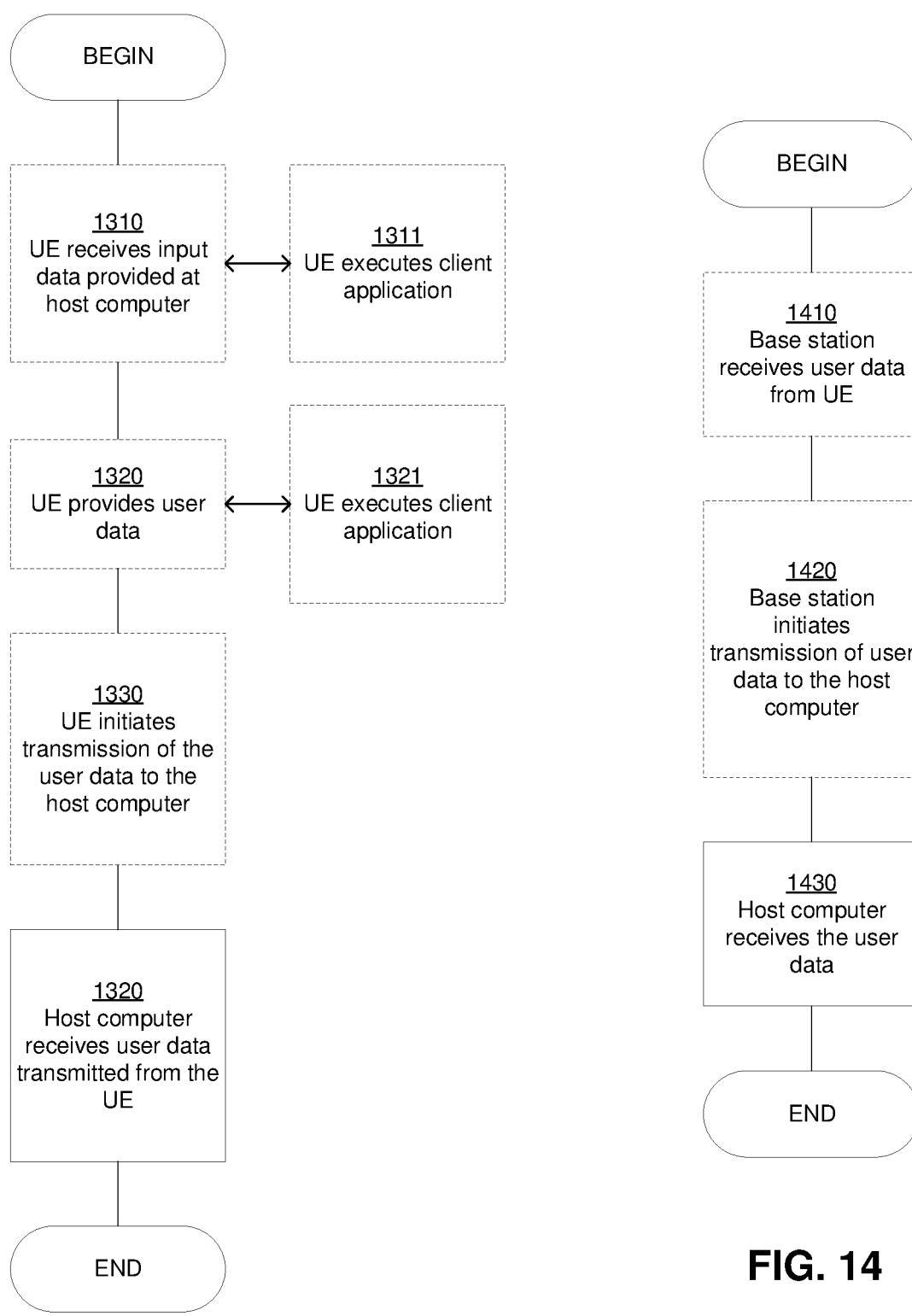

HANDLING OF IDLE MEASUREMENT RESULTS IN RRC_CONNECTED

TECHNICAL FIELD

The present disclosure generally relates to the field of wireless network communications, and more particularly, to a user equipment (UE) adapted to perform idle mode measurements.

BACKGROUND

In 3GPP Release 10, Carrier Aggregation (CA) was introduced in Long Term Evolution (LTE) to enable the user equipment (UE) to transmit/receive information via multiple cells (so called Secondary Cells—SCells) from multiple carrier frequencies, to the benefit of existing non-contiguous and contiguous carriers. In CA terminology, the Primary Cell (PCell) is the cell to which the UE establishes the Radio Resource Control (RRC) connection or is handed over. In CA, cells are aggregated on the Medium Access Control (MAC) level. MAC gets grants for a certain cell and multiplexes data from different bearers to one Transport Block being sent on that cell. Also, MAC is used to control how that process is done. FIG. 1 illustrates an example of MAC-level control.

SCells can be "added" ("configured") for the UE using RRC signaling (e.g., RRCConnectionReconfiguration), which takes 100s of milliseconds. A cell that is configured for the UE becomes a "serving cell" for this UE. An SCell may also be associated with an SCell state. When configured/added via RRC, an SCell starts in a deactivated state. In LTE Rel-15, an eNB can indicate to the UE to activate-upon-configuration, or change the state, at least in RRCReconfiguration, as shown below:

```
1> for each SCell configuredfor the UE other than the P SCell:
  2> if the received RRCConnectionReconfiguration message includes
  sCellState for the SCell and indicates activated:
    3> configure lower layers to consider the SCell to be in activated state;
  2> else if the received RRCConnectionReconfiguration message
  includes sCellState for the SCell and indicates dormant:
    3> configure lower layers to consider the SCell to be in
    dormant state;
  2> else:
    3> configure lower layers to consider the SCell to be in
    deactivated state;
```

In LTE Rel-15, a new intermediate state between the deactivated and active state has been introduced for enhanced uplink operation. A MAC Control Element (MAC CE) can be used to change the SCell state between the three states as shown in FIG. 2. There are also timers in MAC to move a cell between deactivated/activated/dormant. These timers are: sCellHibernationTimer (which moves the SCell from activated state to dormant state); sCellDeactivationTimer (which moves the SCell from activated state to deactivated state); and dormantSCellDeactivationTimer (which moves the SCell from dormant state to deactivated state). The MAC level SCell activation takes 20-30 ms.

Once the network understands the need to configure and/or activate CA, the question is which cells to initially configure and/or activate, if they are configured, and/or whether a cell/carrier is good enough in terms of radio quality/coverage (e.g., Reference Signal Received Power (RSRP) and Reference Signal Received Quality (RSRQ)). To understand the conditions on SCell(s) or potential SCell(s) in a given available carrier, the network may configure the UE to perform Radio Resource Management (RRM) measurements.

Typically, the network may be assisted by RRM measurements reported by a UE. The network may configure the UE with measurement IDs associated with reportConfig with event A1 (serving becomes better than threshold) in case this is a configured SCell, or A4 (neighbor becomes better than threshold) for carriers without a configured SCell. The measurement objects are associated with the carrier on which the network wants reports. If the network is aware of the exact cells it wants the UE to measure, a so-called white cell list can be configured in the measurement object so that the UE is only required to measure these cells in that carrier. FIG. 3 illustrates some configuration signaling.

With the introduction of Dual Connectivity (DC) in Rel-12, it was possible to add what is called a SCG (Secondary Cell Group) configuration to the UE. The main benefit would be that the UE could, in principle, add a cell from another eNodeB. Protocol-wise, that would require different MAC entities, one for each cell group. The UE will have two cell groups, one associated with the PCell (master node) and another associated with a PSCell (of the secondary eNodeB), where each group may possibly have their own associated SCells.

When it comes to adding SCells, when the UE is in single connectivity, just to exemplify, the RRCConnectionReconfiguration message may carry a cell index (so MAC identifiers are optimized, i.e., shorter), cell identifier and carrier frequency, common parameters and state information, later introduced in Rel-15 (activated or dormant).

| Release 15 | |
|---|---|
| SCellToAddModList-r10 ::= | SEQUENCE (SIZE (1..maxSCell-r10)) OF |
| SCellToAddMod-r10 | |
| SCellToAddMod-r10 ::= | SEQUENCE { |
| sCellIndex-r10 | SCellIndex-r10, |
| cellIdentification-r10 | SEQUENCE { |
| physCellId-r10 | PhysCellId, |
| dl-CarrierFreq-r10 | ARFCN-ValueEUTRA |
| } | OPTIONAL, -- Cond SCellAdd |
| radioResourceConfigCommonSCell-r10 | RadioResourceConfigCommonSCell-r10 |
| OPTIONAL, -- Cond SCellAdd | |
| radioResourceConfigDedicatedSCell-r10 | RadioResourceConfigDedicatedSCell-r10 |
| OPTIONAL, -- Cond SCellAdd2 | |
| ..., | |
| [[ dl-CarrierFreq-v1090 | ARFCN-ValueEUTRA-v9e0 |
| OPTIONAL -- Cond EARFCN-max | |
| ]], | |

-continued

| Release 15 | |
|---|---|
| [[ antennaInfoDedicatedSCell-v10i0 OPTIONAL -- Need ON ]], | AntennaInfoDedicated-v10i0 |
| [[ srs-SwitchFromServCellIndex-r14 ]], | INTEGER (0.. 31) OPTIONAL -- NeedON |
| [[ sCellState-r15 OPTIONAL -- Need ON ]] }. | ENUMERATED {activated, dormant} |

FIG. 4 shows a table with field descriptions for RRCConnectionReconfiguration.

The procedure to add SCells to the MCG in LTE (or to modify) is described as follows (as in 3GPP TS 36.331):

5.3.5.3 Reception of an RRCConnectionReconfiguration not including the mobilityControlInfo by the UE
If the RRCConnectionReconfiguration message does not include the mobilityControlInfo
and
the UE is able to comply with the configuration included in this message, the UE shall:
...
  1> if the received RRCConnectionReconfiguration includes the sCellToAddModList:
    2> perform SCell addition or modification as specified in 5.3.10.3b;
...
5.3.10.3bSCell addition/ modification
The UE shall:
  1> for each sCellIndex value included either in the sCellToAddModList or in the
  sCellToAddModListSCG that is not part of the current UE configuration (SCell addition):
    2> add the SCell, corresponding to the cellIdentification, in accordance with the
    radioResourceConfigCommonSCell and radioResourceConfigDedicatedSCell, both
    included either in the sCellToAddModList or in the sCellToAddModListSCG;
    2> if sCellState is configuredfor the SCell and indicates activated:
      3> configure lower layers to consider the SCell to be in activated state;
    2> else if sCellState is configuredfor the SCell and indicates dormant:
      3> configure lower layers to consider the SCell to be in dormant state;
    2> else:
      3> configure lower layers to consider the SCell to be in deactivated state;
    2> for each measid included in the measIdList within VarMeasConfig:
      3> if SC ells are not applicable for the associated measurement; and
      3> if the concerned SCell is included in cellsTriggeredList defined within the
      VarMeasReportList for this measid:
        4> remove the concerned SCell from cellsTriggeredList defined within the
        VarMeasReportList for this measid;
  1> for each sCellIndex value included either in the sCellToAddModList or in the
  sCellToAddModListSCG that is part of the current UE configuration (SCell modification):
    2>modify the SCell configuration in accordance with the
    radioResourceConfigDedicatedSCell, included either in the sCellToAddModList or in
    the sCellToAddModListSCG;

Existing Solution for Early Measurements Upon Idle to Connected Transition in LTE (Rel-15)

In LTE Rel-15, it is possible to configure the UE to report so-called early measurements upon the transition from idle to connected state. Note that the 3GPP specifications for LTE (and NR) include specific definitions for several states, including a state called "RRC_Connected." A device operating while in the RRC_Connected state can be said to be operating in "RRC connected mode," as opposed to, for example, operating in idle mode, where the device is in an idle state as defined by the specifications. For the purposes of the present disclosure, the distinction between RRC_Connected state and RRC connected mode is not important, and these terms may generally be understood as interchangeable, unless the context indicates otherwise. When a device is described herein as entering the RRC Connected state, it should be understood that this refers to entering a defined state in which the device operates in RRC connected mode.

The early measurements mentioned above are measurements that the UE can perform in idle state, according to a configuration provided by the source cell, with the intention that these measurements can be sent to the source cell immediately after the UE gets connected, so that the source cell can quickly setup CA and/or other forms of DC (e.g., EN-DC, MR-DC, etc.) without the need to first provide a measurement configuration (measConfig) in RRC_CONNECTED, as shown in previous sections, and wait for hundreds of milliseconds until first samples are collected, monitored and then the first reports are triggered and transmitted to the network.

A first aspect of the existing solution, as standardized in EUTRA 3GPP TS 36.331, is described in 5.6.20 Idle Mode Measurements. The UE can receive these idle mode measurement configurations in the system information (SIBS) in the field MeasIdleConfigSIB-r15, indicating up to 8 cells or ranges of cell IDs to perform measurements on. In addition, the UE can be either configured upon the transition from RRC_CONNECTED to RRC IDLE with a dedicated measurement configuration in the RRCConnectionRelease message with the measIdleDedicated-r15 which overrides the broadcasted configurations in SIBS. The broadcasted and dedicated signaling is shown below (with bold used for emphasis):

| RRCConnectionRelease message |
|---|
| --ASN1START<br>RRCConnectionRelease ::= SEQUENCE {<br>  rrc-TransactionIdentifier   RRC-TransactionIdentifier,<br>  criticalExtensions        CHOICE {<br>    c1                       CHOICE {<br>      rrcConnectionRelease-r8       RRCConnectionRelease-r8-IEs,<br>      spare3 NULL, spare2 NULL, spare 1 NULL<br>    },<br>    criticalExtensionsFuture    SEQUENCE { }<br>  }<br>}<br>}<br>-- other info has been omitted<br>RRCConnectionRelease-v1530-IEs ::= SEQUENCE {<br>drb-ContinueROHC-r15         ENUMERATED {true}<br>  OPTIONAL, -- Cond UP-EDT<br>nextHopChainingCount-r15      NextHopChainingCount<br>  OPTIONAL, -- Cond UP-EDT<br>*measIdleConfig-r15*            *MeasIdleConfigDedicated-r15*<br>  *OPTIONAL, --Need ON*<br>rrc-InactiveConfig-r15          RRC-InactiveConfig-r15<br>  OPTIONAL, -- Need OR<br>cn-Type-r15                   ENUMERATED {epc,fivegc}<br>  OPTIONAL, -- Need OR<br>nonCriticalExtension          SEQUENCE { }<br>  OPTIONAL<br>-- ASN1STOP              SEQUENCE (SIZE (1..maxSCell-r10)) OF SCellToAddMod-r10 |

| RRCConnectionRelease message |
|---|
| -ASN1START<br>*MeasIdleConfigSIB-r15::= SEQUENCE {*<br>  *measIdleCarrierListEUTRA-r15 EUTRA-CarrierList-r15,*<br>  ...<br>*}*<br>MeasIdleConfigDedicated-rl5 ::= SEQUENCE {<br>  measIdleCarrierListEUTRA-rl5   EUTRA-CarrierList-r15   OPTIONAL, -- Need OR<br>  *measIdleDuration-r15*          *ENUMERATED {sec10, sec30, sec60, sec120,*<br>                                          *{sec180, sec240, sec300, spare},*<br>  ...<br>*}*<br>EUTRA-CarrierList-r15 ::=   SEQUENCE   (SIZE   (1..maxFreqIdle-r15))   OF<br>  MeasIdleCarrierEUTRA-r15<br>*MeasIdleCarrierEUTRA-r15::=  SEQUENCE {*<br>*carrierFreq-r15*               *ARFCN-ValueEUTRA-r9,*<br>*allowedMeasBandwidth-r15  AllowedMeasBandwidth,*<br>*validityArea-r15*             *CellList-r15*                     OPTIONAL, -- Need OR<br>*measCellList-r15*             *CellList-r15*                     OPTIONAL, - - Need OR<br>*reportQuantities*             *ENUMERATED {rsrp, rsrq, both},*<br>*qualityThreshold-r15*        *SEQUENCE {*<br>  *idleRSRP-Threshold-r15*   *RSRP-Range*             OPTIONAL, - - Need OR<br>  *idleRSRQ-Threshold-r15*   *RSRQ-Range-r13*         OPTIONAL - - Need OR<br>*}*                                                                       OPTIONAL, - - Need OR<br>...<br>*}*<br>CellList-r15:=   SEQUENCE (SIZE (1.. maxCellMeasIdle-r15)) OF PhysCellIdRange<br>--ASN1STOP |

FIG. 5 is a table showing MeasIdleConfig field descriptions.

The UE is provided with a list of carriers and optionally with a list of cells for which the UE shall perform measurements. The fields s-NonIntraSearch in SystemInformationBlockType3 do not affect the UE measurement procedures in IDLE mode. Upon the reception of that measurement configuration, the UE starts a timer T331 with the value provided in measIdleDuration, which can go from 0 to 300 seconds. The timer stops upon receiving RRCConnectionSetup, and RRCConnectionResume indicates a transition to RRC_CONNECTED. That concept exists to limit the amount of time the UE performs measurements for the purpose of early measurements.

Another concept introduced in the LTE Rel-15 solution is a validity area, which comprises a list of physical cell identities (PCIs). The intention is to limit the area where CA or DC may be setup later when the UE resumes/setups the connection, so the early measurements are somewhat useful for that purpose. If validityArea is configured, and UE reselects to a serving cell whose PCI does not match any entry in validityArea for the corresponding carrier frequency, the timer T331 is stopped. Then, the UE stops to perform IDLE measurements and releases the configuration (i.e., VarMeasIdleConfig). Notice that this does not necessarily imply that the UE releases the idle measurements that were configured in Release 15 and that were performed. That is, these may still be stored and possibly requested by the network. In addition, the UE may continue with IDLE mode measurements according to the broadcasted SIBS configuration after the timer T331 has expired or stopped.

Notice also that only measurements above a certain quality threshold shall be stored as the cell candidates for CA setup. How the UE performs measurements in IDLE mode is up to UE implementation, as long as RAN4 requirements for measurement reporting defined in 3GPP TS 36.133 are met.

The UE behavior is shown in more detail below as captured in 3GPP TS 36.331:

---

5.6.20 Idle Mode Measurements
5.6.20.1 General
This procedure specifies the measurements done by a UE in RRC IDLE when it has an IDLE mode measurement configuration and the storage of the available measurements by a UE in both RRC_IDLE and RRC_CONNECTED.
5.6.20.2 Initiation
While T331 is running, the UE shall:
  1> perform the measurements in accordance with the following:
    2> for each entry in measIdleCarrierListEUTRA within VarMeasIdleConfig:
      3> if UE supports carrier aggregation between serving carrier and the carrier
      frequency and bandwidth indicated by carrierFreq and allowedMeasBandwidth
      within the corresponding entry;
        4> perform measurements in the carrier frequency and bandwidth indicated by
        carrierFreq and allowedMeasBandwidth within the corresponding entry;
NOTE: The fields s-NonIntraSearch in SystemInformationBlockType3 do not affect the UE measurement procedures in IDLE mode. How the UE performs measurements in IDLE mode is up to UE implementation as long as the requirements in TS 36.133 [16] are met for measurement reporting. UE is not required to perform idle measurements if SIB2 idle measurement indication is not configured.
        4> if the measCellList is included:
          5> consider PCell and cells identified by each entry within the measCellList
          to be applicable for idle mode measurement reporting;
        4> else:
          5> consider PCell and up to maxCellMeasIdle strongest identified cells
          whose RSRP/RSRQ measurement results are above the value(s) provided in
          qualityThreshold (if any) to be applicable for idle mode measurement
          reporting;
        4> store measurement results for cells applicable for idle mode measurement
        reporting within the VarMeasIdleReport;
      3> else:
        4> do not consider the carrier frequency to be applicable for idle mode
        measurement reporting;
  1> if validityArea is configured in VarMeasIdleConfig and UE reselects to a serving cell
  whose physical cell identity does not match any entry in validityArea for the corresponding
  carrier frequency:
    2> stop T331;
5.6.20.3 T331 expiry or stop
The UE shall:
  1> if T331 expires or is stopped:
    2> release the VarMeasIdleConfig;
NOTE:It is up to UE implementation whether to continue IDLE mode measurements according to SIB5 configuration after T331 has expired or stopped.

---

Notice that it is not mandatory for the source node releasing/suspending the UE to provide a dedicated idle measurement configuration for the purpose of early measurements. If the UE is released/suspended to idle without being provided with a list of carriers to be measured, the UE obtains that from SIB2, as written below:

---

1> if the RRCConnectionRelease message includes the measIdleConfig:
  2> clear VarMeasIdleConfig and VarMeasIdleReport;
  2> store the received measIdleDuration in VarMeasIdleConfig;
  2> start T331 with the value of measIdleDuration;
  2> if the measIdleConfig contains measIdleCarrierListEUTRA:
    3> store the received measIdleCarrierListEUTRA in VarMeasIdleConfig;
  2> else:
    3> store the measIdleCarrierListEUTRA received in SIB5 in
    VarMeasIdleConfig;
  2> start performing idle mode measurements as specified in 5.6.20;

---

And, in that case of the list not being provided in RRCConnectionRelease, at every cell reselection the UE performs the SIBS acquisition to possibly update its list of carriers to measure as shown below:

---

5.2.2.12 Actions upon reception of SystemInformationBlockType5
Upon receiving SystemInformationBlockType5, the UE shall:
  1> if in RRC_IDLE and UE has stored VarMeasIdleConfig and SIB5
  includes the measIdleConfigSIB and the UE is capable of IDLE mode
  measurements for CA:
    2> if T331 is running and VarMeasIdleConfig does not contain
    measIdleCarrierListEUTRA receivedfrom the RRCConnectionRelease
    message:
      3> store the measIdleCarrierListEUTRA of measIdleConfigSIB within
      VarMeasIdleConfig;
    2> perform idle mode measurements on supported carriers as specified
    in 5.6.20;

If the UE enters a cell within the validity area that is not broadcasting the measurement configuration in SIBS, the UE continues to perform idle measurements according to the STUBS acquired in the source cell (i.e. the cell the UE was suspended or released).

---

5.3.3.4 Reception of the RRCConnectionSetup by the UE
NOTE 1:     Prior to this, lower layer signalling is used to allocate a C-RNTI. For further details see TS 36.321 [6];
The UE shall:
    << skipped parts>
  1> set the content of RRCConnectionSetupComplete message as follows:
    << skipped parts>>
    2> if the UE is connected to EPC:
      3> except for NB-IOT:
        4> if the UE has radio link failure or handover failure information available in VarRLF-Report and if the RPLMN is included in plmn-IdentityList stored in VarRLF-Report:
          5> include rlf-InfoAvailable;
      4> if the UE has MBSFN logged measurements available for E-UTRA and if the RPLMN is included in plmn-IdentityList stored in VarLogMeasReport:
        5> include logMeasAvailableMBSFN;
      4> else if the UE has logged measurements available for E-UTRA and if the RPLMN is included in plmn-IdentityList stored in VarLogMeasReport:
        5> include logMeasAvailable;
      4> if the UE has Bluetooth logged measurements available and if the RPLMN is included in plmn-IdentityList stored in VarLogMeasReport:
        5> include logMeasAvailableBT;
      4> if the UE has WLAN logged measurements available and if the RPLMN is included in plmn-IdentityList stored in VarLogMeasReport:
        5> include logMeasAvailable WLAN;
      4> if the UE has connection establishment failure information available in VarConnEstFailReport and if the RPLMN is equal to plmn-Identity stored in VarConnEstFailReport:
        5> include connEstFailInfoAvailable;
      4> include the mobilityState and set it to the mobility state (as specified in TS 36.304 [4]) of the UE just prior to entering RRC_CONNECTED state;
      *4> if the SIB2 contains idleModeMeasurements, and the UE has IDLE mode measurement information available in VarMeasIdleReport:*
        *5> include the idleMeasAvailable;*
      4> stop T331, if running;
      4> if the UE has flight path information available:
        5> include flightPathInfoAvailable;
  << skipped parts>
  1> submit the RRCConnectionSetupComplete message to lower layers for transmission;
  1> the procedure ends.
5.3.3.4a Reception of the RRCConnectionResume by the UE
The UE shall:
  << skipped parts>
  1> set the content of RRCConnectionResumeComplete message as follows:
    2> set the selectedPLMN-Identity to the PLMN selected by upper layers (see TS 23.122 [11], TS 24.301 [35] for E-UTRA/EPC and TS 24.501 [95] for E-UTRA/5GC) from the PLMN(s) included in the plmn-IdentityList in SystemInformationBlockType 1;
    2> set the dedicatedInfoNAS to include the information received from upper layers;
    2> except for NB-IOT:
      3> if resuming an RRC connection from a suspended RRC connection:
    << skipped parts>
      *4> if the SIB2 contains idleModeMeasurements, and the UE has IDLE mode measurement information available in VarMeasIdleReport:*
        *5> include the idleMeasAvailable;*
      4> stop T331, if running;
      4> if the UE has flight path information available:
        5> include flightPathInfoAvailable;
  << skipped parts>
  1> submit the RRCConnectionResumeComplete message to lower layers for transmission;
  1> the procedure ends.
5.3.8.3 Reception of the RRCConnectionRelease by the UE
The UE shall:
  << skipped parts
  *1> if the RRCConnectionRelease message includes the measIdleConfig:*
    *2> clear VarMeasIdleConfig and VarMeasIdleReport;*
    *2> store the received measIdleDuration in VarMeasIdleConfig;*
    *2> start T331 with the value of measIdleDuration;*
    *2> if the measIdleConfig contains measIdleCarrierListEUTRA:*
      *3> store the received measIdleCarrierListEUTRA in VarMeasIdleConfig;*
      *3> start performing idle mode measurements as specified in 5.6.20;*
*NOTE 2: If the measIdleConfig does not contain measIdleCarrierListEUTRA, UE may receive measIdleCarrierListEUTRA as specified in 5.2.2.12.*
  1> for NB-IOT, if the RRCConnectionRelease message includes the redirectedCarrierInfo:
    2> if the redirectedCarrierOffsetDedicated is included in the redirectedCarrierInfo:

-continued

```
        3> store the dedicated offset for the frequency in redirectedCarrierInfo;
        3> start timer T322, with the timer value set according to the value of T322 in
           redirectedCarrierInfo;
   1> if the releaseCause received in the RRCConnectionRelease message indicates
      loadBalancingTAURequired:
      2> perform the actions upon leaving RRC_CONNECTED as specified in 5.3.12, with
         release cause 'load balancing TAU required';
   1> else if the releaseCause received in the RRCConnectionRelease message indicates cs-
FallbackHighPriority:
      2> perform the actions upon leaving RRC_CONNECTED as specified in 5.3.12, with
         release cause 'CS Fallback High Priority';
   1> else:
      2> if the waitTime is present:
         3> start timer T302, with the timer value set according to the waitTime;
         3> inform the upper layer that access barring is applicable for all access
            categories except categories '0' and '2';
      2> if the extendedWaitTime is present; and
      2> if the UE supports delay tolerant access or the UE is a NB-IOT UE:
         3> forward the extendedWaitTime to upper layers;
      2> if the extendedWaitTime-CPdata is present and the NB-IOT UE only supports the
         Control Plane CIOT EPS optimisation:
         3> forward the extendedWaitTime-CPdata to upper layers;
      2> if the releaseCause received in the RRCConnectionRelease message indicates rrc-
Suspend:
         3> perform the actions upon leaving RRC_CONNECTED as specified in 5.3.12,
            with release cause 'RRC suspension';
      2> else if rrc-InactiveConfig is included:
         3> perform the actions upon entering RRC INACTIVE as specified in 5.3.8.7;
      2> else:
         3> perform the actions upon leaving RRC_CONNECTED or RRC INACTIVE as
            specified in 5.3.12, with release cause 'other';
5.6.5.3 Reception of the UEInformationRequest message
Upon receiving the UEInformationRequest message, the UE shall, only after successful
security activation:
   << skipped parts>
   1> if the idleModeMeasurementReq is included in the UEInformationRequest and UE
      has stored VarMeasIdleReport:
      2> set the measResultListIdle in the UEInformationResponse message to the value
         of meas ReportIdle in the VarMeasIdleReport;
      2> discard the VarMeasIdleReport upon successful delivery of the
         UEInformationResponse message confirmed by lower layers;
   1> if flightPathInfoReq field is present and the UE has flight path information available:
      2> include the flightPathInfoReport and set it to include the list of waypoints along the
         flight path;
      2> if the include TimeStamp is set to TRUE:
         3> set the field timeStamp to the time when UE intends to arrive to each waypoint
            if this information is available at the UE;
   1> if the logMeasReport is included in the UEInformationResponse:
      2> submit the UEInformationResponse message to lower layers for transmission via
         SRB2;
      2> discard the logged measurement entries included in the logMeasInfoList from
         VarLogMeasReport upon successful delivery of the UEInformationResponse message
         confirmed by lower layers;
   1> else:
      2> submit the UEInformationResponse message to lower layers for transmission via
         SRB1;
```

In LTE Rel-15 euCA, the concept of idle mode measurements and early measurement reporting was introduced. The UE could be configured with measurement configurations in RRCConnectionRelease. When the UE returns to RRC_CONNECTED, if the target cell indicates idleModeMeasurements in SIB2 and the UE has available idle mode measurements (indicated in the RRC specifications to be stored in a UE variable called VarMeasIdleReport), the UE includes a flag called idleMeasAvailable in RRCConnectionSetupComplete or RRCConnectionResumeComplete. The network can then request the UE in UEInformationRequest to report the early measurements in UEInformationResponse.

The UE deletes the idle mode measurements if the UE successfully reports them in UEInformationResponse, or if the UE receives an RRCRelease message that includes a measIdleConfig (i.e., new idle mode measurement configurations). Both cases are shown below:

```
5.6.5.3 Reception of the UEInformationRequest message
Upon receiving the UEInformationRequest message, the UE shall, only
after successful security activation:
   <<skipped parts>
   1> if the idleModeMeasurementReq is included in the
      UEInformationRequest and UE has stored VarMeasIdleReport:
      2> set the measResultListIdle in the UEInformationResponse
         message to
         the value of measReportIdle in the VarMeasIdleReport;
      2> discard the VarMeasIdleReport upon successful delivery of the
         UEInformationResponse message confirmed by lower layers;
...
5.3.8.3 Reception of the RRCConnectionRelease by the UE may
The UE shall:
   <<skipped parts>
   1> if the RRCConnectionRelease message includes the measIdleConfig:
      2> clear VarMeasIdleConfig and VarMeasIdleReport;
      2> store the received measIdleDuration in VarMeasIdleConfig;
      2> start T331 with the value of measIdleDuration;
```

-continued

```
2> if the measIdleConfig contains measIdleCarrierListEUTRA:
   3> store the received measIdleCarrierListEUTRA in
   VarMeasIdleConfig;
   3> start performing idle mode measurements as specified in 5.6.20;
NOTE 2: If the measIdleConfig does not contain
measIdleCarrierListEUTRA, UE receive measIdleCarrierListEUTRA
as specified in 5.2.2.12.;
```

SUMMARY

If the solutions discussed above are implemented, there may be some problems. For example, if the UE is configured with idle mode measurements in one cell and then establishes/resumes the connection in another cell that does not support idle mode measurement reporting, it would not indicate the idleModeMeasurements in SIB2, and the UE would not indicate that it has any idle mode measurements to the network, so the network would not request these stored measurements.

When after that the network later releases the UE to RRC IDLE, it would not include any idle mode measurement configurations and, since there was no discarding/cleaning up of stored idle measurements, the UE would keep the old idle mode measurements. If the UE later establishes/resumes in a cell which supports idle mode measurements, the UE would then report that it has (the old) idle mode measurement, which the network could possibly request. The network could then receive very old and outdated idle mode measurements, which may have been performed in a completely different area. This problem is illustrated in FIG. 6.

Another related issue is that the idle measurement results could be large in the Rel-16 context, as they can include both LTE and New Radio (NR) measurements, where the NR measurement could have detailed beam level measurements as well. As such, the UE may end up wasting valuable memory space, for a considerable time, on storing information that is not valid anyway.

Embodiments described herein are directed to a wireless device that handles stored idle measurements that are performed for early reporting. According to some embodiments, a wireless device may delete stored idle mode measurement results if certain events/conditions occur at the UE. One such event could be if the UE successfully reports the idle mode measurements in an RRC Resume Complete like message (e.g., RRCResumeComplete in NR). In this alternative, the network would not need these measurements in further procedures once it received an RRC Resume Complete (even if the network in theory could request again with UE Information Request). Another event for deletion may be if the UE successfully reports the idle mode measurements in an RRC Resume Request (or similar) message (e.g., RRCResumeRe quest or RRCResumeRequest1 in NR). In this alternative, the network would not need these measurements in further procedures once it received an RRC Resume Request (even if the network in theory could request again with a UE Information Request or in Resume). Another behavior for deletion could include receiving an RRCConnectionRelease/RRCRelease message without idle mode measurement configurations. Another event may include receiving an RRCConnectionRelease/RRCRelease message with or without idle mode measurement configurations, only if the UE receives that while is in RRC_CONNECTED. One event may include receiving a handover message (e.g., RRCConnectionReconfiguration with MobilityControlInfo, RRCReconfiguration with reconfWithSync, MobilityFrom-EUTRACommand, MobilityFromNRCommand).

Another event may include receiving a reconfiguration message adding/modifying SCell/SCG. In one embodiment, the UE deletes the idle mode measurements upon reception of the RRCConnectionReconfiguration/RRCReconfiguration containing, for example, mrdc-SecondaryCellGroupConfig in NR or nr-Config in LTE. In another embodiment, the UE deletes the idle mode measurements upon reception of the RRCConnectionReconfiguration/RRCReconfiguration comprising SCell addition/modification (e.g., sCellToAddModList). In one embodiment, the UE deletes the idle mode measurements upon reception of an indication for SCell activation/deactivation. In one instance, this is an RRCConnectionReconfiguration/RRCReconfiguration comprising, for example, the field sCellState. In another instance, this is a MAC control element, such as the SCell Activation/Deactivation MAC CEs. In another instance, this is an L1 signal, such as a downlink control information (DCI) signal activating/deactivating an SCell.

One event may include receiving a message configuring new connected mode measurements (e.g., RRCConnectionReconfiguration/RRCReconfiguration or RRCConnectionResume/RRCResume with measConfig). In one instance, the UE deletes the idle mode measurements upon reception of the RRCConnectionReconfiguration/RRCReconfiguration with measConfig. In another instance, the UE deletes the idle mode measurements upon successfully obtaining connected mode measurements based on the resumed measurement configurations.

One event may include receiving a message resuming connected mode measurements (e.g., RRCConnectionResume/RRCResume message with or without a measConfig). In one instance, the UE deletes the idle mode measurements upon reception of the RRCResume/RRCConnectionResume message that resumes the connected mode measurements. In another instance, the UE deletes the idle mode measurements upon successfully obtaining connected mode measurements based on the resumed measurement configurations. In another instance, the UE deletes the idle mode measurements when this condition occurs in a cell without an indication in system information that the cell supports idle measurements for early reporting.

In one event, the UE has entered RRC_CONNECTED and experiences a failure (e.g., radio link failure, integrity check failure, reconfiguration failure, etc.). In one instance, the UE deletes the idle mode measurements upon detecting the failure. In another instance, the UE deletes the idle mode measurements upon transmitting an RRCReestablishmentRequest message. In another instance, the UE deletes the idle mode measurements upon receiving an RRCReestablishment message.

In one event, the UE has entered RRC_CONNECTED but has not been requested to report the early measurements before a timer expires. In another event, the UE resumes/sets up the connection in a cell that does not broadcast an indication in system information that the cell supports idle measurements for early reporting.

One advantage of the embodiments is that the UE is prevented from unnecessarily keeping idle mode measurements that are too old. The UE may possibly report them and confuse the network whether these are really up to date or useful measurements for various purposes. Another advantage is that memory resources at the UE are released when these measurements are known to not be needed by the network.

According to some embodiments, a method, in a UE adapted to perform idle mode measurements, includes performing and storing one or more radio signal measurements while in an idle mode or inactive state. The method includes deleting the stored radio signal measurements in response to any one of the following events: receiving an RRC release message that does not include an idle mode measurement configuration; receiving an RRC release message while in RRC_Connected state; receiving a handover message; receiving a reconfiguration message adding a secondary cell for carrier aggregation; receiving a reconfiguration message modifying a secondary cell for carrier aggregation; receiving a reconfiguration message activating or deactivating a secondary cell for carrier aggregation; receiving a message configuring one or more new connected mode measurements; successfully obtaining one or more connected mode measurements; receiving a message instructing the UE to resume one or more connected mode measurements; entering RRC Connected state and subsequently experiencing a radio link failure, integrity check failure, or reconfiguration failure; entering RRC_Connected state and failing to receive a request for reporting of idle mode measurements before expiry of a timer for maintaining idle mode measurements; and resuming or establishing a connection in a cell that does not broadcast an indication that the cell support supports early reporting of idle mode measurements.

The method may include receiving an idle mode measurement configuration from a source cell when entering the idle mode or inactive state, wherein said performing one or more radio signal measurements is according to the received idle mode measurement configuration. The method may also include, prior to deleting the stored radio signal measurements, entering a connected state without being requested to report the idle mode measurements.

Further aspects of the present invention are directed to an apparatus, wireless device, UE, network node, base station, relay node, network devices, computer program products or computer readable storage medium corresponding to the methods summarized above and functional implementations of the above-summarized wireless relay node.

Advantages of the embodiments also include the UE avoiding the indefinite keeping of idle mode measurement results and, consequently, avoiding the report of them much later. If that reporting would have happened, the network could receive outdated idle measurements and possibly make decisions based on these outdated measurements. These decisions may include decisions about handover, release and redirect, setup of dual connectivity, setup of carrier aggregation, etc. For example, the UE could be handed over to a cell based on these measurements that is reportedly a good cell (e.g., with strong RSRP and RSRQ), while in reality is no longer a good cell, hence creating interference and/or leading to a handover failure/re-establishment. In other example, the UE could be added to an SCG based on these measurements that is reportedly a good cell (e.g., with strong RSRP and RSRQ), while in reality is no longer a good cell, hence creating interference and/or leading to an SCG failure.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 4 shows a table of RRCConnectionReconfiguration field descriptions.
FIG. 5 shows a table of MeasIdleConfig field descriptions.
FIG. 11, FIG. 12, FIG. 13, and FIG. 14 are flowcharts illustrating example methods implemented in a communication system including a host computer, a base station and a user equipment.

DETAILED DESCRIPTION

Figure 1:
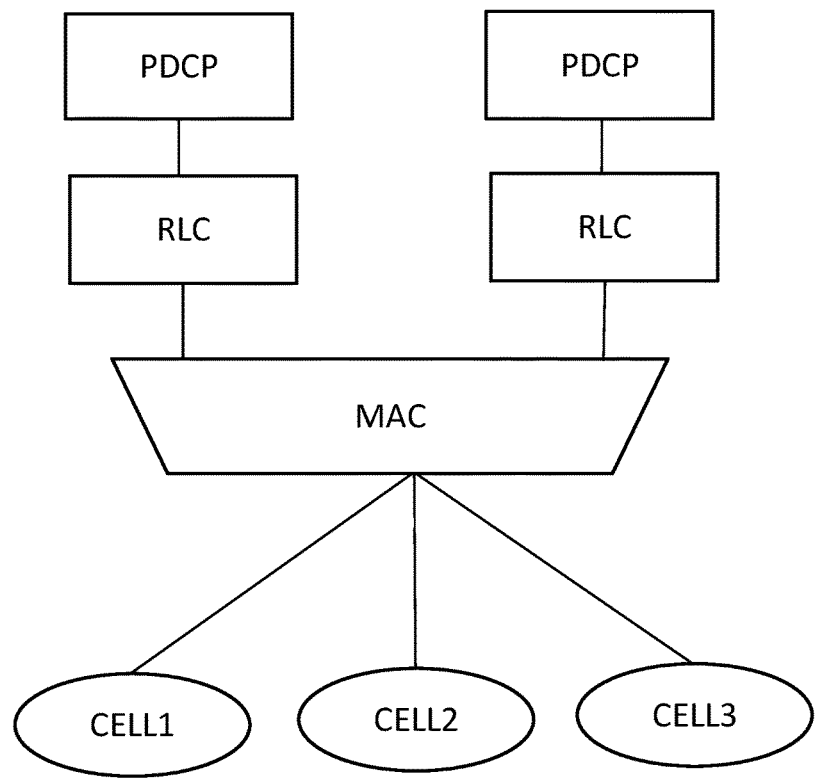
FIG. 1 illustrates an example of MAC-level control.
Figure 2:
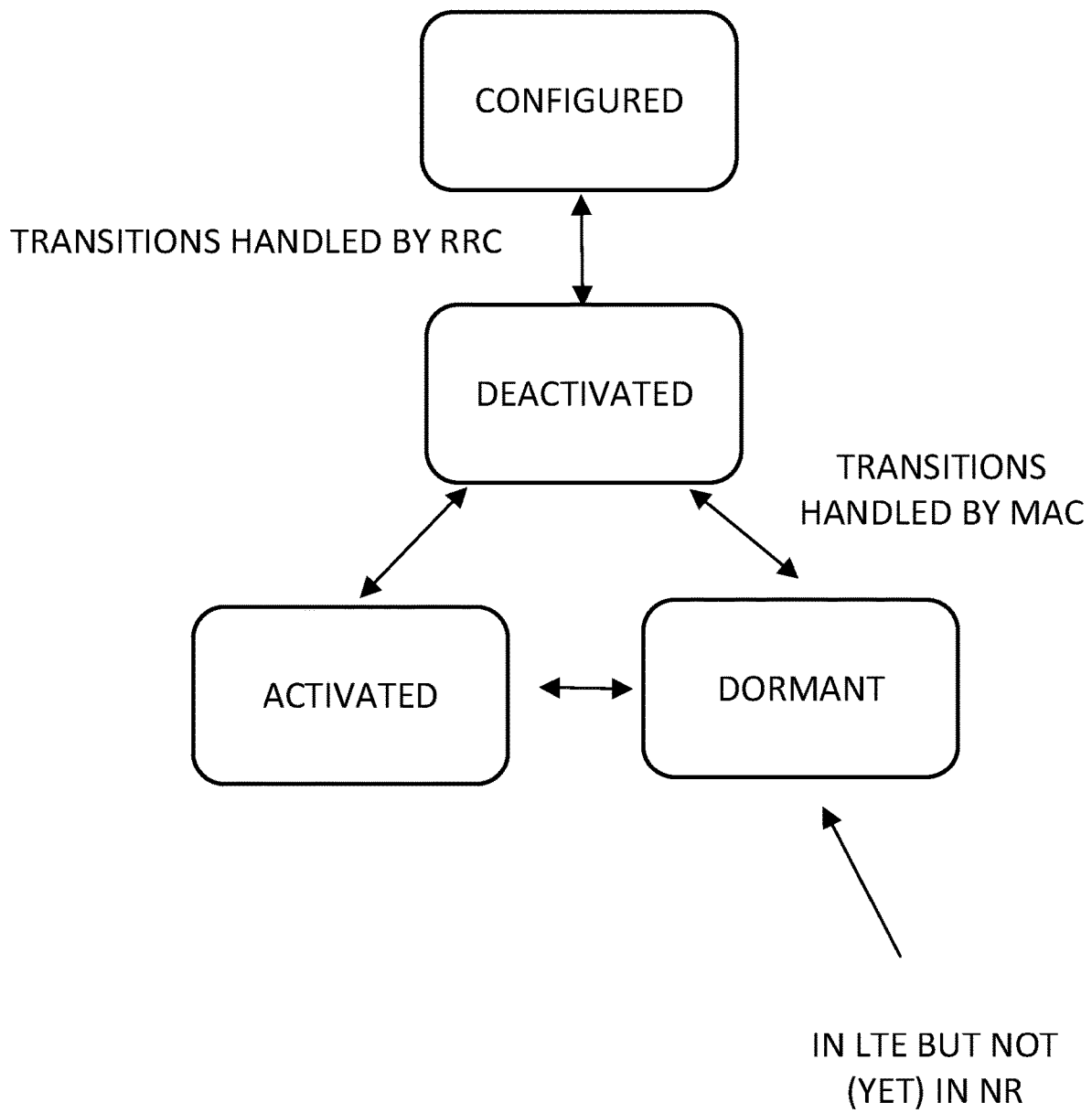
FIG. 2 illustrates state changes.
Figure 3:
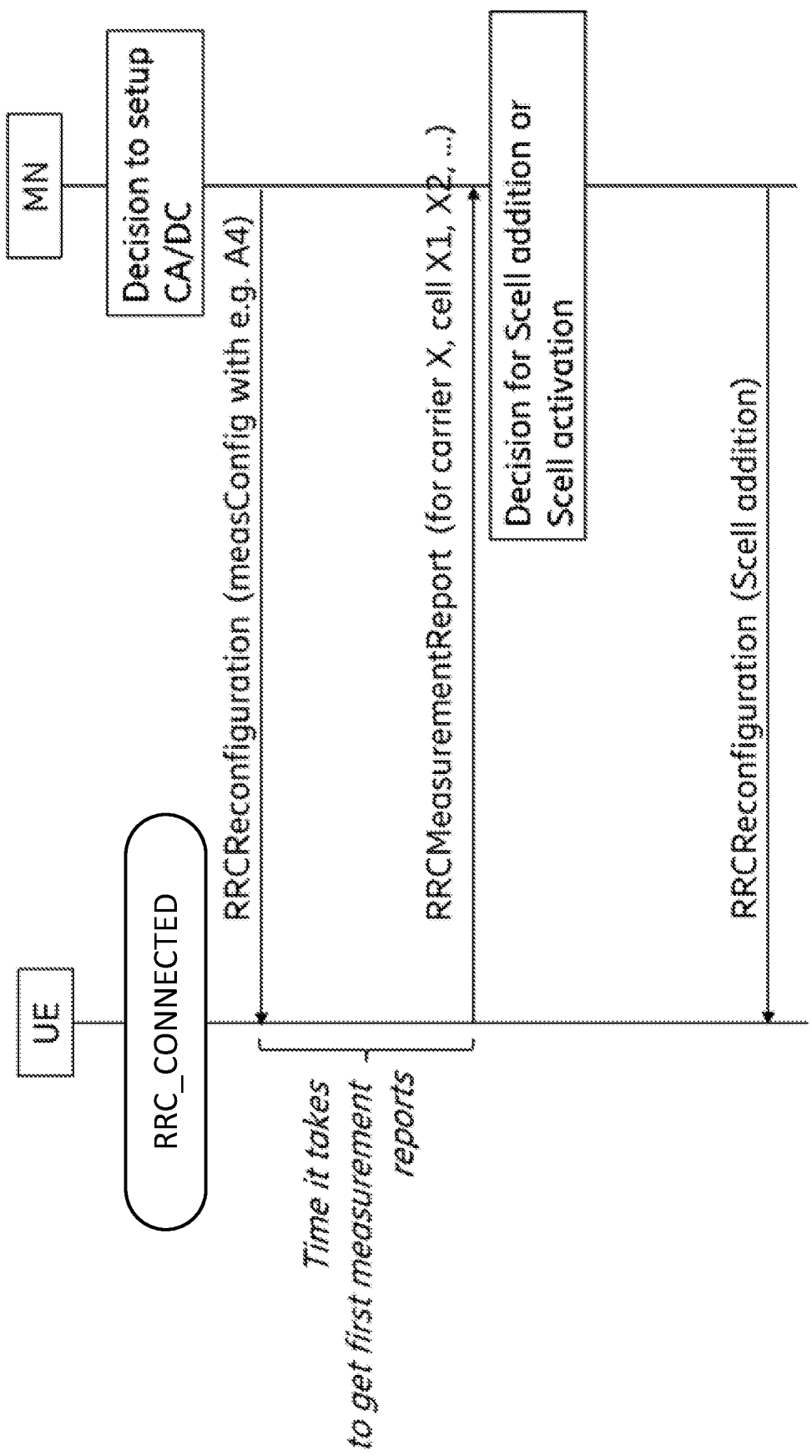
FIG. 3 illustrates configuration signaling.
Figure 6:
FIG. 6 illustrates a signaling diagram for idle mode measurement reporting.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE or NR, but can be adapted to other radio access technologies where the techniques or selections may be relevant. It should be understood that the specific names used herein for various messages may change, in subsequent versions of a particular standard, or may differ, in other standards, and that the techniques described herein may be implemented using similar messages, regardless of the names used for those messages.

References herein to 3GPP TS 36.xxx, 3GPP TS 38.xxx, TS 36.xxx, or TS 38.xxx should be understood as referring to the specifications developed and maintained by the 3rd-Generation Partnership Project (3GPP). Where no version is specified, it should be assumed that these references refer to the most current version as of 25 Jun. 2019.

Particular embodiments described herein may be based on the existing LTE idle mode procedures in 3GPP TS 36.331 v15.5.1. It has been agreed that idle mode measurements will be introduced in LTE inactive, as well as NR idle and inactive, but the precise procedures have not been specified yet. The changes proposed for LTE are equally applicable to NR. In various embodiments, the intra-RAT (radio access technology) case is used as an example, but the method is applicable for inter-RAT procedures where the UE is being suspended in a first RAT (e.g., NR) and has a stored idle measurement for early report, and the UE performs inter- RAT cell reselection (and further procedures such as resume/setup attempt). The term "power saving state" may be used for Inactive state and IDLE. However, the term is applicable to any other power saving state where the UE is configured to perform measurements for early reporting.

In one embodiment, a method at a UE or wireless terminal for handling idle mode measurement results includes receiving and storing idle mode measurement configurations from a source cell when entering a power saving state (e.g., RRC IDLE, RRC IDLE with suspended RRC connection, RRC INACTIVE) and performing idle mode measurements according to the configurations. The method further includes leaving the power saving state and entering a connected state (e.g., RRC_CONNECTED) without being requested to report the idle mode measurement results. The method includes deleting the idle mode measurement results upon reporting the idle mode measurements in an RRC Resume Complete (or similar) message (e.g., RRCResumeComplete in NR). In this alternative, the network would not need these measurements in further procedures once it got an RRC Resume Complete (even if the network in theory could request again with UE Information Request). The deletion may occur as part of the procedure upon receiving an RRC Resume (or similar) message containing the indication to report idle measurements in Resume Complete. And, the results are deleted only after an acknowledgement that the message with the measurements was successfully delivered.

An example of how that could be implemented in the NR RRC specifications (3GPP TS 38.331) is shown below (with bold used as emphasis):

```
5.3.13.4    Reception of the RRCResume by the UE
The UE shall:
    1> stop timer T319;
    1> stop timer T380, if running;
    1> if the RRCResume includes the fullConfig:
        2> perform the full configuration procedure as specified in 5.3.5.11;
    1> else:
        2> restore the masterCellGroup and pdcp-Config from the UE Inactive AS context;
    1> discard the UE Inactive AS context;
    1> release the suspendConfig except the ran-NotificationAreaInfo;
    1> if the RRCResume includes the masterCellGroup:
        2> perform the cell group configuration for the received masterCellGroup according
        to 5.3.5.5;
    1> if the RRCResume includes the radioBearerConfig:
        2> perform the radio bearer configuration according to 5.3.5.6;
    1> if the RRCResume message includes the sk-Counter:
        2> perform security key update procedure as specified in 5.3.5.7;
    1> if the RRCResume message includes the radioBearerConfig2:
        2> perform the radio bearer configuration according to 5.3.5.6;
    1> resume SRB2 and all DRBs;
    1> if stored, discard the cell reselection priority information provided by the
    cellReselectionPriorities or inheritedfrom another RAT;
    1> stop timer T320, if running;
    1> if the RRCResume message includes the measConfig:
        2> perform the measurement configuration procedure as specified in 5.5.2;
    1> resume measurements if suspended;
    1> if T390 is running:
        2> stop timer T390for all access categories;
        2> perform the actions as specified in 5.3.14.4;
    1> if T302 is running:
        2> stop timer T302;
        2> perform the actions as specified in 5.3.14.4;
    1> enter RRC_CONNECTED;
    1> indicate to upper layers that the suspended RRC connection has been resumed;
    1> stop the cell re-selection procedure;
    1> consider the current cell to be the PCell;
    1> set the content of the of RRCResumeComplete message as follows:
        2> if the idleModeMeasurementReq is included in the RRCResume and UE has
        stored VarMeasIdleReport;
            3> set the measResultListIdle in the RRCResumeComplete message to the value
            of measReportIdle in the VarMeasIdleReport;
            3> discard the VarMeasIdleReport upon successful delivery of the
            RRCResumeComplete message is confirmed by lower layers;
        2> if the upper layer provides NAS PDU, set the dedicatedNAS-Message to include the
        information receivedfrom upper layers;
        2> if the upper layer provides a PLMN, set the selectedPEMN-Identity to PEMN
        selected by upper layers (TS 24.501 [23]) from the PLMN(s) included in the plmn-
        IdentityList in SIB1;
        2> if the masterCellGroup contains the reportUplinkTxDirectCurrent:
            3> include the uplinkTxDirectCurrentList for each serving cell with UL;
            3> if UE is configured with SUL carrier:
                4> include uplinkDirectCurrentBWP-SUL for each serving cell with SUL
                within the uplinkTxDirectCurrentList;
    1> submit the RRCResumeComplete message to lower layers for transmission;
    1> the procedure ends.;
```

In another embodiment, deletion of stored idle mode measurements may occur upon reporting the idle mode measurements in RRC Resume Request (or similar) message (e.g., RRCResumeRequest or RRCResumeRequest1 in NR). In this alternative, the network would not need these measurements in further procedures once it received an RRC Resume Request (even if the network in theory could request again with UE Information Request or in Resume).

Deletion may also occur upon receiving RRCConnectionRelease/RRCRelease message without idle mode measurement configurations.

In the existing 3GPP specification, the UE would delete the VarMeasIdleReport (i.e., the idle mode measurement results) if it received an RRCConnectionRelease comprising the measIdleConfig. However, if the UE has stored idle mode measurements when it connects to a cell that does not support idle mode measurements, it will not be requested to report them and would not delete the results. If the UE later is released to RRC IDLE or RRC INACTIVE, it would receive an RRCConnectionRelease message. Since the cell does not support idle mode measurements, it would not include the measIdleConfig, and the UE would keep the old idle mode measurements. If the UE deletes the idle mode measurements regardless of whether the RRCConnectionRelease/RRCRelease message contains the measIdleConfig, the UE would not store and report outdated measurements.

An example of the embodiment is shown below for LTE (in 3GPP TS 36.331 v15.5.1). Similar implementations could be introduced for NR idle mode measurements (for RRC IDLE and/or RRC INACTIVE).

---

5.3.8.3 Reception of the RRCConnectionRelease by the UE
The UE shall:
    <<skipped parts>>
    *1> clear VarMeasIdleReport, if stored;*
    1> if the RRCConnectionRelease message includes the measIdleConfig:
        2> clear VarMeasIdleConfig*[[ and VarMeasIdleReport]]*;
        2> store the received measIdleDuration in VarMeasIdleConfig;
        2> start T331 with the value of measIdleDuration;
        2 > if the measIdleConfig contains measIdleCarrierListEUTRA:
            3> store the received measIdleCarrierListEUTRA in VarMeasIdleConfig;
            3> start performing idle mode measurements as specified in 5.6.20;
    NOTE 2: If the measIdleConfig does not contain measIdleCarrierListEUTRA, UE may receive measIdleCarrierListEUTRA as specified in 5.2.2.12.

---

In another embodiment, the deletion may occur upon receiving an RRCConnectionRelease/RRCRelease message only if the UE receives that while it is in RRC_CONNECTED. The difference compared to the previous embodiment (where the UE always deletes the measurements upon reception of RRC Release (or similar) message) is that the UE keeps the idle mode measurement results if it receives the RRCConnectionRelease/RRCRelease message while the UE is in RRC IDLE or RRC INACTIVE. This may be as a response to an RRC Resume Request like message (e.g., RRCResumeRequest or RRCResumeRequest1). This may, for instance, happen if the UE tries to establish/resume in a cell that is overloaded (or request a service that is not supported in that cell), and the cell release and redirects the UE to another cell or when a resume procedure is triggered by a RAN area update. In that case, the UE would be able to report the idle mode measurement results in the new target cell.

An example of the embodiment is shown below for LTE (in 3GPP TS 36.331 v15.5.1), where the UE first checks whether it received the RRCConnectionRelease message in response to an RRCConnectionResumeRequest or RRCConnectionSetupRequest message. In one instance, the UE may check whether it is in RRC_CONNECTED if it should delete/clear the idle mode measurements (VarMeasIdleReport). Similar implementations could be introduced for NR idle mode measurements (for RRC IDLE and/or RRC INACTIVE).

---

5.3.8.3 Reception of the RRCConnectionRelease by the UE
The UE shall:
    <<skipped parts>>
    *1> except if the RRCConnectionRelease message is received in response to an RRCConnectionResumeRequest or RRCConnectionSetupRequest; or*
        *2> clear VarMeasIdleReport, if stored;*
        2> clear VarMeasIdleReport, if stored;
    1> if the RRCConnectionRelease message includes the measIdleConfig:
        2> clear VarMeasIdleConfig*[[ and VarMeasIdleReport]]*;
        2> store the received measIdleDuration in VarMeasIdleConfig;
        2> start T331 with the value of measIdleDuration;

-continued

> 2> if the measIdleConfig contains measIdleCarrierListEUTRA:
>> 3> store the received measIdleCarrierListEUTRA in VarMeasIdleConfig;
>> 3> start performing idle mode measurements as specified in 5.6.20;
> NOTE 2: If the measIdleConfig does not contain measIdleCarrierListEUTRA, UE may receive measIdleCarrierListEUTRA as specified in 5.2.2.12.

In one embodiment, deletion occurs upon receiving a handover message (e.g., RRCConnectionReconfiguration with mobilityControlInfo, RRCReconfiguration with reconfWithSync, MobilityFromEUTRACommand, MobilityFromNRCommand.

In another embodiment, the UE keeps the idle mode measurements after it has entered RRC_CONNECTED (unless requested to report them in RRCResumeComplete or UEInformationResponse) until the UE receives a message handing over the UE to another cell. In LTE, this would be indicated by receiving the RRCConnectionReconfiguration message with the field mobilityControlInfo included (for intra-LTE handover) or by receiving the MobilityFromEUTRACommand (for inter-RAT handover). In either case, the network has indicated that it cannot serve the UE anymore and since it has not requested the idle mode measurements, it is not interested in receiving them.

In NR, the corresponding handover message would be the RRCReconfiguration message with the ReconfWithSync (for intra-NR handover) or the MobiltiyFromNRCommand (for inter-RAT handover). In one instance, the UE only deletes the idle mode measurements if the handover command indicates a handover to another cell and/or node, i.e., the UE keeps the idle mode measurements for intra-cell, and/or intra-node handover (including intra-gNB-CU handover). In another instance, the UE deletes the idle mode measurements upon the reception of the handover command (RRCConnectionReconfiguration with mobilityControlInfo/ RRCReconfiguration with reconfWahSync/MobilityFromEUTRACommand/MobilityFrom NRCommand). In another instance, the UE deletes the idle mode measurements upon completing the handover (e.g., successfully connected to the target, transmitted the complete message, etc.). In another variant, an intra-cell handover may be used by the network as a way to delete these measurements.

The example below shows when the UE deletes the idle mode measurements upon receiving the handover command in LTE (intra-LTE or inter-RAT). Similar implementations could be introduced for NR idle mode measurements.

> 5.3.5.4 Reception of an RRCConnectionReconfiguration including the mobilityControlInfo by the UE (handover)
> If the RRCConnectionReconfiguration message includes the mobilityControlInfo and the UE is able to comply with the configuration included in this message, the UE shall:
>> 1> stop timer T310, if running;
>> 1> stop timer T312, if running;
>> 1> start timer T304 with the timer value set to t304, as included in the mobilityControlInfo;
>> 1> stop timer T370, if running;
>> 1> if the carrierFreq is included:
>>> 2> consider the target PCell to be one on the frequency indicated by the carrierFreq with a physical cell identity indicated by the targetPhysCellId;
>> 1> else:
>>> 2> consider the target PCell to be one on the frequency of the source PCell with a physical cell identity indicated by the targetPhysCellId;
>> 1> if T309 is running:
>>> 3> stop timer T309 for all access categories;
>>> 2> perform the actions as specified in 5.3.16.4.
>> 1> start synchronising to the DL of the target PCell;
>> 1> clear VarMeasIdleReport, if stored;
> 5.4.3.3 Reception of the MobilityFromEUTRACommand by the UE
> The UE shall be able to receive a MobilityFromEUTRACommand message and perform a cell change order to GERAN, even if no prior UE measurements have been performed on the target cell.
> The UE shall:
>> 1> stop timer T310, if running;
>> 1> stop timer T312, if running;
>> 1> if T309 is running:
>>> 2> stop timer T309 for all access categories;
>>> 2> perform the actions as specified in 5.3.16.4.
>> 1> clear VarMeasIdleReport, if stored;
>> 1> if the MobilityFromEUTRACommand message includes the purpose set to handover:

In another example, the idle mode measurements are deleted upon the completion of the inter-RAT handover, as seen below.

> 5.4.3.4 Successful completion of the mobility from E-UTRA
> Upon successfully completing the handover, the cell change order or enhanced 1xRTT CS fallback, the UE shall:
>> 1> clear VarMeasIdleReport, if stored;
>> 1> if the targetRAT-Type in the received MobilityFromEUTRACommand is set to eutra (intra-EUTRA inter-system HO):
  2> the procedure ends;
1> else if the UE is connected to 5GC and the targetRAT-Type in the received MobilityFromEUTRACommand is set to nr:
  2> reset MAC;
  2> stop all timers that are running;
  2> release ran-NotificationAreaInfo, if stored;
  2> release the AS security context including the KRRCenc key, the KRRCint, the KUPint key and the KUPenc key, if stored;
  2> release all radio resources, including release of the RLC entity and the MAC configuration;
  2> if the NR RRCReconfiguration message included in the received MobilityFromEUTRACommand does not include fullConfig:
    3> maintain source RAT configuration of PDCP and SDAP for applicable RBs which is used for target RATRBs;
  2> else:
    3> release the associated PDCP entity and SDAP entity for all established RBs;
  2> indicate the release of the RRC connection to upper layers together with the release cause 'other';
1> else:
  2> perform the actions upon leaving RRC_CONNECTED as specified in 5.3.12, with release cause 'other';
NOTE: If the UE performs enhanced 1xRTT CS fallback along with concurrent mobility to CDMA2000 HRPD and the connection to either CDMA2000 1xRTT or CDMA2000 HRPD succeeds, then the mobility from E-UTRA is considered successful.

In one embodiment, deletion of idle mode measurements occurs upon receiving a reconfiguration message configuring SCG and/or SCell. For example, the UE may delete the idle mode measurements upon reception of the RRCConnectionReconfiguration/RRCReconfiguration containing, for example, mrdc-SecondaryCellGroupConfig or endc-ConFIG. In another embodiment, the UE deletes the idle mode measurements upon reception of the RRCConnectionReconfiguration/RRCReconfiguration comprising SCell addition/modification (e.g., sCellToAddModList). In one embodiment, the UE deletes the idle mode measurements upon reception of an indication for SCell activation/deactivation. In one instance, this is in the RRCConnectionReconfiguration/RRCReconfiguration comprising, for example, the field sCellState. In another instance, this is a MAC control element, such as the SCell Activation/Deactivation MAC CE. In one instance, this is an L1 signal, such as a DCI signal activating/deactivating an SCell. An example of this addition to 3GPP TS 36.331 includes:

5.3.5.3 Reception of an RRCConnectionReconfiguration not including the mobilityControlInfo by the UE.
If the RRCConnectionReconfiguration message does not include the mobilityControlInfo and the UE is able to comply with the configuration included in this message, the UE shall:
  << skipped parts>>
  1> if the received RRCConnectionReconfiguration includes the sCellToReleaseList:
    2> perform SCell release as specified in 5.3.10.3a;
  1> if the received RRCConnectionReconfiguration includes the sCellToAddModList:
    2> perform SCell addition or modification as specified in 5.3.10.3b;
    **2> clear *VarMeasIdleReport*, if stored;**
  1> if the received RRCConnectionReconfiguration includes the sCellGroupToReleaseList:
    2> perform SCell group release as specified in 5.3.10.3d;
  1> if the received RRCConnectionReconfiguration includes the sCellGroupToAddModList:
    2> perform SCell group addition or modification as specified in 5.3.10.3e;
    **2> clear *VarMeasIdleReport*, if stored;**
  1> if the received RRCConnectionReconfiguration includes the scg-Configuration; or
  1> if the current UE configuration includes one or more split DRBs configured with pdcp-Config and the received RRCConnectionReconfiguration includes radioResourceConfigDedicated including drb-ToAddModList:
    2> perform SCG reconfiguration as specified in 5.3.10.10;
    **2> clear *VarMeasIdleReport*, if stored;**
  1> if the received RRCConnectionReconfiguration includes the nr-Config and it is set to release: or
  1> if the received RRCConnectionReconfiguration includes endc-ReleaseAndAdd and it is set to TRUE:
    2> perform EN-DC release as specified in TS 38.331 [82], clause 5.3.5.10;
  1> if the received RRCConnectionReconfiguration includes the sk-Counter:
    2> perform key update procedure as specified in TS 38.331 [82], clause 5.3.5.7;
  1> if the received RRCConnectionReconfiguration includes the nr-SecondaryCellGroupConfig:
    2> perform NR RRC Reconfiguration as specified in TS 38.331 [82], clause 5.3.5.3;
    **2> clear *VarMeasIdleReport*, if stored;**
  1> if the received RRCConnectionReconfiguration includes the nr-RadioBearerConfig1:
    2> perform radio bearer configuration as specified in TS 38.331 [82], clause 5.3.5.6;

-continued

1> if the received RRCConnectionReconfiguration includes the nr-RadioBearerConfig2:
    2> perform radio bearer configuration as specified in TS 38.331 [82], clause 5.3.5.6;
1> if this is the first RRCConnectionReconfiguration message after successful completion of the RRC connection re-establishment procedure:
    2> resume SRB2 and all DRBs that are suspended, if any, including RBs configured with NR PDCP;

NOTE 4: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].

NOTE 5: The UE may discard SRB2 messages and data that it receives prior to completing the reconfiguration used to resume these bearers.

1> if the received RRCConnectionReconfiguration includes the systemInformationBlockType1Dedicated:
    2> perfom the actions upon reception of the SystemInformationBlockType 1 message as specified in 5.2.2.7;
1> if the received RRCConnectionReconfiguration includes the systemInformationBlockType2Dedicated:
    2> perfom the actions upon reception of the SystemInformationBlockType2 message as specified in 5.2.2.9;
1> if the RRCConnectionReconfiguration message includes the dedicatedInfoNASList:
    2> forward each element of the dedicatedInfoNASList to upper layers in the same order as listed;
1> if the RRCConnectionReconfiguration message includes the measConfig:
    2> perform the measurement configuration procedure as specified in 5.5.2;
1> perform the measurement identity autonomous removal as specified in 5.5.2.2a;
1> if the RRCConnectionReconfiguration message includes the otherConfig:
    2> perform the other configuration procedure as specified in 5.3.10.9;
1> if the RRCConnectionReconfiguration message includes the sl-DiscConfig or sl-CommConfig:
    2> perform the sidelink dedicated configuration procedure as specified in 5.3.10.15;
1> if the RRCConnectionReconfiguration message includes the sl-V2X-ConfigDedicated:
    2> perform the V2X sidelink communication dedicated configuration procedure as specified in 5.3.10.15a;
1> if the RRCConnectionReconfiguration message includes wlan-OffloadInfo:
    2> perform the dedicated WLAN offload configuration procedure as specified in 5.6.12.2;
1> if the RRCConnectionReconfiguration message includes rclwi-Configuration:
    2> perform the WLAN traffic steering command procedure as specified in 5.6.16.2;
1> if the RRCConnectionReconfiguration message includes lwa-Configuration:
    2 > perform the LWA configuration procedure as specified in 5.6.14.2;
1> if the RRCConnectionReconfiguration message includes lwip-Configuration:
    2> perform the LWIP reconfiguration procedure as specified in 5.6.17.2;
1> upon RRC connection establishment, if UE does not need UL gaps during continuous uplink transmission:
    2> configure lower layers to stop using UL gaps during continuous uplink transmission in FDD for RRCConnectionReconfigurationComplete message and subsequent uplink transmission in RRC_CONNECTED except for UL transmissions as specified in TS36.211 [21];
1> set the content of RRCConnectionReconfigurationComplete message as follows:
    2> if the RRCConnectionReconfiguration message includes perCC-GapIndicationRequest:
        3> include perCC-GapIndicationList and numFreqEffective;
    2> if the frequencies are configuredfor reduced measurement performance:
        3> include numFreqEffectiveReduced;
    2> if the received RRCConnectionReconfiguration message included nr-SecondaryCellGroupConfig:
        3> include scg-ConfigResponseNR in accordance with TS 38.331 [82], clause 5.3.5.3;
1> submit the RRCConnectionReconfigurationComplete message to lower layers for transmission using the new configuration, upon which the procedure ends;

In another embodiment, deletion of idle mode measurements occurs when the UE receives a message configuring new connected mode measurements (e.g., RRCConnectionReconfiguration/RRCReconfiguration with measConfig).

If the UE has entered RRC_CONNECTED without being requested to report the idle mode measurements in either RRCResumeComplete, or in UEInformationResponse, the UE may receive a reconfiguration message configuring new connected mode measurements. Since the network has not requested that the UE report the idle mode measurements, this would indicate to the UE that the network is not interested in receiving them.

In one embodiment, the UE deletes the idle mode measurements upon the reception of the message configuring the new connected mode measurements as shown below for LTE. A similar procedure could be introduced for NR.

---

5.3.5.3 Reception of an RRCConnectionReconfiguration not including the mobilityControlInfo by the UE
If the RRCConnectionReconfiguration message does not include the mobilityControlInfo and the UE is able to comply with the configuration included in this message, the UE shall:
    <<skipped parts>>
  1> if the RRCConnectionReconfiguration message includes the measConfig:
    2> perform the measurement configuration procedure as specified in 5.5.2;
    *2> clear VarMeasIdleReport, if stored;*
    <<skipped parts>>
5.3.5.4 Reception of an RRCConnectionReconfiguration including the mobilityControlInfo by the UE (handover)
If the RRCConnectionReconfiguration message includes the mobilityControlInfo and the UE is able to comply with the configuration included in this message, the UE shall:
    <<skipped parts>>
  1> perform the measurement related actions as specified in 5.5.6.1;
  1> if the RRCConnectionReconfiguration message includes the measConfig:
    2> perform the measurement configuration procedure as specified in 5.5.2;
    *2> clear VarMeasIdleReport, if stored;*

---

In one instance, the UE deletes the idle mode measurements upon successfully obtaining new connected mode measurements either for any measurement object, or for a measurement object corresponding to the cell/frequency/beam for which there is an idle mode measurement.

---

5.5.3 Performing measurements
5.5.3.1 General
For all measurements, except for UE Rx-Tx time difference measurements, RSSI, UL PDCP Packet Delay per QCI measurement, channel occupancy measurements, CBR measurement, sensing measurement and except for WLAN measurements of Band, Carrier Info, Available Admission Capacity, Backhaul Bandwidth, Channel Utilization, and Station Count, the UE applies the layer 3 filtering as specified in 5.5.3.2, before using the measured results for evaluation of reporting criteria or for measurement reporting. When performing measurements on NR carriers, the UE derives the cell quality as specified in 5.5.3.3 and the beam quality as specified in 5.5.3.4.
The UE shall:
  1> whenever the UE has a measConfig, perform RSRP and RSRQ measurements for each serving cell as follows:
    2> for the PCell, apply the time domain measurement resource restriction in accordance with measSubframePatternPCell, if configured;
    2> if the UE supports CRS based discovery signals measurement:
      3> for each SCell in deactivated state, apply the discovery signals measurement timing configuration in accordance with measDS-Config, if configured within the measObject corresponding to the frequency of the SCell;
  1> if the UE has a measConfig with rs-sinr-Config configured, perform RS-SINR (as indicated in the associated reportConfig) measurements as follows:
    2> perform the corresponding measurements on the frequency indicated in the associated measObject using available idle periods or using autonomous gaps as necessary;
  1> for each measId included in the measIdList within VarMeasConfig:
    2> if the purpose for the associated reportConfig is set to reportCGI:
      3> if the RAT indicated in the associated measObject is not NR:
        4> if si-RequestForHO is configuredfor the associated reportConfig:
          5> perform the corresponding measurements on the frequency and RAT indicated in the associated measObject using autonomous gaps as necessary;
        4> else:
          5> perform the corresponding measurements on the frequency and RAT indicated in the associated measObject using available idle periods or using autonomous gaps as necessary;
      3> else:
        4> perform the corresponding measurements on the NR frequency indicated in the associated measObject using available idle periods;

-continued

NOTE 1: If autonomous gaps are used to perform measurements, the UE is allowed to temporarily abort communication with all serving cell(s), i.e. create autonomous gaps to perform the corresponding measurements within the limits specified in TS 36.133 [16]. Otherwise, the UE only supports the measurements with the purpose set to reportCGI only if E-UTRAN has provided sufficient idle periods.
  3> try to acquire the global cell identity of the cell indicated by the cellForWhichToReportCGI in the associated measObject by acquiring the relevant system information from the concerned cell;
  3> if an entry in the cellAccessRelatedInfoList includes the selected PEMN, acquire the relevant system information from the concerned cell;
  3> if the cell indicated by the cellForWhichToReportCGI included in the associated measObject is an E-UTRANcell:
    4> try to acquire the CSG identity, if the CSG identity is broadcast in the concerned cell;
    4> try to acquire the trackingAreaCode in the concerned cell;
    4> try to acquire the list of additional PLMN Identities, as included in the plmn-IdentityList, if multiple PLMN identities are broadcast in the concerned cell;
    4> if cellAccessRelatedInfoList is included, use trackingAreaCode and plmn-IdentityList from the entry of cellAccessRelatedInfoList containing the selected PLMN;
    4> if the includeMultiBandInfo is configured:
      5> try to acquire the freqBandIndicator in the SystemInformationBlockType1of the concerned cell;
      5> try to acquire the list of additional frequency band indicators, as included in the multiBandInfoList, if multiple frequency band indicators are included in the SystemInformationBlockType1of the concerned cell;
      5> try to acquire the freqBandIndicatorPriority, if the freqBandIndicatorPriorityisincludedinthe SystemInformationBlockType1of the concerned cell;
    4> if cellAccessRelatedInfoList-5GC is broadcast in the concerned cell and the UE is E-UTRA/5GC capable:
      5> try to acquire the cellAccessRelatedInfoList-5GC;
NOTE 2: The 'primary' PLMN is part of the global cell identity.
  3> if the cell indicated by the cellForWhichToReportCGI included in the associated measObject is a UTRAN cell:
    4> try to acquire the LAC, the RAC and the list of additional PLMN Identities, if multiple PLMN identities are broadcast in the concerned cell;
    4> try to acquire the CSG identity, if the CSG identity is broadcast in the concerned cell;
  3> if the cell indicated by the cellForWhichToReportCGI included in the associated measObject is a GERAN cell:
    4> try to acquire the RAC in the concerned cell;
  3> if the cell indicated by the cellForWhichToReportCGI included in the associated measObject is a CDMA2000 cell and the cdma2000-Type included in the measObject is typeHRPD:
    4> try to acquire the Sector ID in the concerned cell;
  3> if the cell indicated by the cellForWhichToReportCGI included in the associated measObject is a CDMA2000 cell and the cdma2000-Type included in the measObject is type1XRTT:
    4> try to acquire the BASE ID, SID and NID in the concerned cell;
  3> if the cell indicated by the cellForWhichToReportCGI included in the associatedMeasObject is an NR cell:
    4> if the indicated cell is broadcasting SIB1 (see TS 38.213 [88], clause 13):
      5> try to acquire the plmn-IdentityInfoList including plmn-IdentityList, trackingAreaCode (if available), ran-AreaCode (if available) and cellidentity for each entry of the plmn-IdentityInfoList;
      5> try to acquire the frequencyBandList, if multiple frequency bands are broadcasted in the concerned cell;
2> if the ul-DelayConfig is configuredfor the associated reportConfig:
  3> ignore the measObject;
  3> configure the PDCP layer to perform UL PDCP Packet Delay per QCI measurement;
2> else:
  3> if a measurement gap configuration is setup; or
  3> if the UE does not require measurement gaps to perform the concerned measurements:
    4> if s-Measure is not configured; or
    4> if s-Measure is configured and the PCell RSRP, after layer 3 filtering, is lower than this value; or
    4> if the associated measObject concerns NR; or
    4> if measDS-Config is configured in the associated measObject:
      5> if the UE supports CSI-RS based discovery signals measurement; and
      5> if the eventId in the associated reportConfig is set to eventC1 or eventC2, or if reportStrongestCSI-RSs is included in the associated reportConfig:
        6> perform the corresponding measurements of CSI-RS resources on the frequency indicated in the concerned measObject, applying the discovery signals measurement timing configuration in accordance with

```
        measDS-Config in the concerned measObject;
      6> if reportCRS-Meas is included in the associated reportConfig,
      perform the corresponding measurements of neighbouring cells on the
      frequencies indicated in the concerned measObject as follows:
        7> for neighbouring cells on the primary frequency, apply the time
        domain measurement resource restriction in accordance with
        measSubframePatternConfigNeigh, if configured in the concerned
        measObject;
        7> apply the discovery signals measurement timing configuration in
        accordance with measDS-Config in the concerned measObject;
    5> else:
      6> perform the corresponding measurements of neighbouring cells on
      the frequencies and RATs indicated in the concerned measObject as
      follows:
        7> for neighbouring cells on the primary frequency, apply the time
        domain measurement resource restriction in accordance with
        measSubframePatternConfigNeigh, if configured in the concerned
        measObject;
        7> if the UE supports CRS based discovery signals measurement,
        apply the discovery signals measurement timing configuration in
        accordance with measDS-Config, if configured in the concerned
        measObject;
  4> if the ue-RxTxTimeDiffPeriodical is configured in the associated
  reportConfig:
    5> perform the UE Rx-Tx time difference measurements on the PCell;
  4> if the reportSSTD-Meas is set to true or pSCell in the associated
  reportConfig:
    5> perform SSTD measurements between the PCell and the PSCell;
  4> if the reportSFTD-Meas is set to pSCell in the associated reportConfig:
    5> perform SFTD measurements between the PCell and the NR PSCell;
  4> if the reportSFTD-Meas is set to neighborCells in the associated
  reportConfig:
    5> perform SFTD measurements between the PCell and NR cell(s) on the
    frequency indicated in the associated measObject;
  4> if the measRSSI-ReportConfig is configured in the associated reportConfig:
    5> perform the RSSI and channel occupancy measurements on the
    frequency indicated in the associated measObject;
2> perform the evaluation of reporting criteria as specified in 5.5.4;
2> *if the UE has stored VarMeasIdleReport:*
  3> *clear VarMeasIdleReport;*
```

In an embodiment, deletion of idle mode measurements may occur when the UE receives a message resuming connected mode measurements (e.g., RRCConnectionResume/RRCResume with or without measConfig). For example, the UE deletes the idle mode measurements upon reception of the RRCResume/RRCConnectionResume message, which resumes the connected mode measurements.

In one embodiment, the UE deletes the idle mode measurements upon successfully obtaining connected mode measurements based on the resumed measurement configurations. In another embodiment, the UE deletes the idle mode measurements when this condition occurs in a cell without an indication in system information that the cell supports idle measurements for early reporting. An example implementation of this is shown below, and similar procedures can be introduced for NR and LTE/5GC from RRC INACTIVE.

```
5.3.3.4a Reception of the RRCConnectionResume by the UE
The UE shall:
    <<skipped parts>>
  1> set the content of RRCConnectionResumeComplete message as follows:
    2> set the selectedPEMN-Identity to the PEMN selected by upper layers (see TS 23.122
    [11], TS 24.301 [35] for E-UTRA/EPC and TS 24.501 [95] for E-UTRA/5GC) from the
    PEMN(s) included in the plmn-IdentityList in SystemInformationBlockType1;
    2> set the dedicatedInfoNAS to include the information receivedfrom upper layers;
    2> except for NB-IoT:
      3> if resuming an RRC connection from a suspended RRC connection:
        4> if the UE has radio link failure or handover failure information available in
        VarRLF-Report and if the RPEMN is included in plmn-IdentityList stored in
        VarREF-Report:
          5> include rlf-InfoAvailable;
        4> if the UE has MBSFN logged measurements available for E-UTRA and if
        the RPEMN is included in plmn-IdentityList stored in VarLogMeasReport:
          5> include logMeasAvailableMBSFN;
        4> else if the UE has logged measurements available for E-UTRA and if the
        RPEMN is included in plmn-IdentityList stored in VarLogMeasReport:
          5> include logMeasAvailable;
        4> if the UE has Bluetooth logged measurements available and if the RPLMN
        is included in plmn-IdentityList stored in VarLogMeasReport:
          5> include logMeasAvailableBT;
```

-continued

```
      4> if the UE has WLAN logged measurements available and if the RPEMN is
      included in plmn-IdentityList stored in VarLogMeasReport:
         5> include logMeasAvailableWLAN;
      4> if the UE has connection establishment failure information available in
      VarConnEstFailReport and if the RPEMN is equal to plmn-Identity stored in
      VarConnEstFailReport:
         5> include connEstFailInfoAvailable;
      4> include the mobilityState and set it to the mobility state (as specified in TS
      36.304 [4]) of the UE just prior to entering RRC_CONNECTED state;
      4> if the SIB2 contains idleModeMeasurements, and the UE has IDLE mode
      measurement information available in VarMeasIdleReport:
         5> include the idleMeasAvailable;
      4> else:
         5> clear the VarMeasIdleReport;
      4> stop T331, if running;
      4> if the UE has flight path information available:
         5> include flightPathInfoAvailable;
   3> if the UE supports storage of mobility history information and the UE has
   mobility history information available in VarMobilityHistoryReport:
      4> include mobilityHistoryAvail;
2> for NB-IoT:
   3> if the UE supports serving cell idle mode measurements reporting and
   servingCellMeasInfo is present in SystemInformationBlockType2-NB:
      4> set the measResultServCell to include the measurements of the serving cell;
NOTE 2: The UE includes the latest results of the serving cell measurements as used
for cell selection/ reselection evaluation, which are performed in accordance with the
performance requirements as specified in TS 36.133 [16].
1> submit the RRCConnectionResumeComplete message to lower layers for transmission;
1> the procedure ends.
```

In one embodiment, deletion occurs when the UE experiences a failure in RRC_CONNECTED (e.g., radio link failure, integrity check failure, reconfiguration failure, etc.) For example, the UE may delete the idle mode measurements upon detecting a radio link failure.

```
1> upon T312 expiry; or

1> upon random access problem indication from MCG MAC while neither T300, T301,

T304 nor T311 is running; or

1> upon indication from MCG RLC, which is allowed to be send on PCell, that the maximum number of retransmissions has been reachedfor an SRB or DRB:

2> consider radio link failure to be detected for the MCG i.e. RTF;

2> clear the VarMeasIdleReport, if stored;

2> except for NB-IoT, store the following radio link failure information in the VarRLF- Report by setting its fields as follows:

<<skipped parts>>

2> if AS security has not been activated:

3> if the UE is a NB-IoT UE:

4> if the UE supports RRC connection re-establishment for the Control Plane

CIoTEPS optimisation:

5> initiate the RRC connection re-establishment procedure as specified in 5.3.7;

4> else:

5> perform the actions upon leaving RRC_CONNECTED as specified in 5.3.12, with release cause 'RRC connection failure';

3> else:

4> perform the actions upon leaving RRC_CONNECTED as specified in 5.3.12, with release cause 'other';

2> else:

3> initiate the connection re-establishment procedure as specified in 5.3.7;

<<skipped parts>>
```

Similar embodiments can be seen for the other failure cases.

In another embodiment, the UE deletes the idle mode measurements upon transmitting an RRCReestablishmentRequest message.

---

5.3.7.4 Actions related to transmission ofRRCConnectionReestablishmentRequest message
Except for NB-IoT, if the procedure was initiated due to radio link failure or handover failure, the UE shall:
  1> set the reestablishmentCellId in the VarRLF-Report to the global cell identity of the selected cell;
  *1> clear the VarMeasIdleReport, if stored;*
<<skipped parts>>

---

In another embodiment, the UE deletes the idle mode measurements upon receiving an RRCReestablishment message.

---

5.3.7.5 Reception of the RRCConnectionReestablishment by the UE
NOTE 1:  Prior to this, lower layer signalling is used to allocate a C-RNTI. For further details see TS 36.321 [6];
The UE shall:
  1> stop timer T301;
  1> consider the current cell to be the PCell;
  *1> clear the VarMeasIdleReport, if stored;*
<<skipped parts>>

---

In an embodiment, deletion of idle mode measurements may occur upon a defined time period having elapsed since the UE entered RRC_CONNECTED (e.g., a timer started when the UE entered RRC_CONNECTED). That part of the method relies on a timer T3xx that may have at least one of the starting conditions: Timer T3xx starts upon the UE entering Connected state; or Timer T3xx starts upon the stop or expiry of timer T331 (i.e., any timer that, while running, the UE is required to perform early measurements). The reasoning here is that there is some time that the UE is required to store the idle measurements after the UE stops to perform idle measurements.

The timer T3xx may have at least one of the stopping conditions: the UE successfully reports the idle measurements; or the UE discards the measurement due to some other conditions, for example, upon reception of a message, as one of the cases described in the method. Upon the expiry or stop of timer T3xx, the UE deletes the idle measurements. Another aspect is that the timer T3xx may be configured.

---

5.3.3.4 Reception of the RRCConnectionSetup by the UE
NOTE 1:  Prior to this, lower layer signalling is used to allocate a C-RNTI. For further details see TS 36.321 [6];
The UE shall:
    <<skipped parts>>
  1> enter RRC_CONNECTED;
  *1> if the UE has IDLE mode measurement information available in VarMeasIdleReport:*
    *2> start timer T3xx with the value idleMeasStoringTime;*
    <<skipped parts>>
5.3.3.4a    Reception of the RRCConnectionResume by the UE
The UE shall:
    <<skipped parts>>
  1> enter RRC_CONNECTED;
  *1> if the UE has IDLE mode measurement information available in VarMeasIdleReport:*
    *2> start timer T3xx with the value idleMeasStoringTime included in the RRCConnectionReconfiguration message;*
    << skipped parts>>
*5.3x.x T3xx expiry or stop*
*The UE shall:*
  *1> if timer T3xx expires:*
    *2> clear VarMeasIdleReport, if stored;*

An example of the RRCConnectionSetup message may be as follows:

```
--ASN1START
RRCConnectionSetup ::=        SEQUENCE {
    rrc-TransactionIdentifier     RRC-Transactionidentifier,
    criticalExtensions            CHOICE {
        c1                            CHOICE {
            rrcConnectionSetup-r8        RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture      SEQUENCE {}
    }
}
RRCConnectionSetup-r8-IEs ::=   SEQUENCE {
    radioResourceConfgDedicated       RadioResourceConfgDedicated,
    nonCriticalExtension              RRCConnectionSetup-v8a0-IEs   OPTIONAL
RRCConnectionSetup-v8a0-IEs ::= SEQUENCE {
    lateNonCriticalExtension          OCTET STRING   OPTIONAL,
    nonCriticalExtension              RRCConnectionSetup-v16xx-IEs OPTIONAL
}
RRCConnectionSetup-v16xx-IE::=    SEQUENCE {
    idleMeasStoringTime               ENUMERATED {s30, s60, s120, s240
                                        s300, s420, s600, s900}
                                                   OPTIONAL, --Need ON
    lateNonCriticalExtension          OCTET STRING           OPTIONAL,
    nonCriticalExtension              SEQUENCE{}             OPTIONAL
}
--ASN1STOP
```

An example of an RRCConnectionResume message may be as follows:

```
--ASN1START
RRCConnectionResume-r13 ::=   SEQUENCE {
    rrc-TransactionIdentifier     RRC-TransactioIdentifier,
    criticalExtensions            CHOICE {
        c1                            CHOICE {
            rrcConnectionResume-r13       RRCConnectionResume-r13-IEs,
            spare3                        NULL,
            spare2                        NULL,
            spare1                        NULL
        }
        criticalExtensionsFuture     SEQUENCE { }
    }
}
RRCConnectionResume-r13-IEs := SEQUENCE {
    radioResourceConfigDedicated-r13  RadioResourceConfigDedicated
        OPTIONAL, -- Need ON
    nextHopChainingCount-r13          NextHopChainingCount,
    measConfig-r13                    MeasConfig
        OPTIONAL, -- Need ON
    antennaInfoDedicatedPCell-r13     AntennaInfoDedicated-v10i0
        OPTIONAL, -- Need ON
    drb-ContinueROHC-r13              ENUMERATED {true}
        OPTIONAL, -- Need OP
    lateNonCriticalExtension          OCTET STRING   OPTIONAL,
    rrcConnectionResume-v1430-IEs     RRCConnectionResume-v1430-IEs
        OPTIONAL
}
RRCConnectionResume-v1430-IEs := SEQUENCE {
    otherConfig-r14                               OtherConfig-r9
                                        OPTIONAL,    -- Need ON
    rrcConnectionResume-v1510-IEs             RRCConnectionResume-v1510-
    IEs OPTIONAL
}
RRCConnectionResume-v 1510-IEs := SEQUENCE {
    sk-Counter-r15                INTEGER (0.. 65535)  OPTIONAL, -- Need ON
    nr-RadioBearerConfig1-r15     OCTET STRING         OPTIONAL, -- Need ON
    nr-RadioBearerConfig2-r15     OCTET STRING         OPTIONAL, -- Need ON
    nonCriticalExtension          RRCConnectionResume-v1530-IEs
        OPTIONAL
}
```

-continued

```
RRCConnectionResume-v1530-IEs :: = SEQUENCE {
    fullConfig-r15         ENUMERATED {true}OPTIONAL, -- NeedON
    nonCriticalExtension   RRCConnectionResume-v16xx-IEs    OPTIONAL
}
RRCConnectionResume-v16xx-IEs   ::= SEQUENCE {
    idleMeasStoringTime            ENUMERATED {s30, s60, s120, s240,
                                                {s300, s420, s600, s900}
                                   OPTIONAL, -- Need ON
    nonCriticalExtension           SEQUENCE {}    OPTIONAL
}
--ASN1STOP
```

The example values in the message could be any specified value. In another embodiment, only a single timer value is specified, which does not have to be signaled in the RRCConnectionSetup/RRCConnectionResume message.

In an embodiment, deletion of idle mode measurements occurs upon receiving an RRCConnectionRelease/RRCRelease message with an explicit configuration that the UE shall delete stored idle mode measurements. The UE may receive an explicit configuration within the RRCConnectionRelease/RRCRelease message that instructs the UE whether it shall delete or maintain the stored idle mode measurements. The configuration may then include information about whether the UE shall delete or maintain stored measurements (or different parts of them), dependent on further criteria, such as how old the measurements are, the level of the measurements (e.g., carrier, cell or beam level); and/or what objects the measurements are for (e.g., what specific RAT, carrier or cell they concern).

An example of the RRCConnectionRelease message is:

```
--ASN1START
RRCConnectionRelease :: =           SEQUENCE {
    rrc-TransactionIdentifier           RRC-TransactionIdentifier,
    criticalExtensions                  CHOICE {
        c1                                  CHOICE {
            rrcConnectionRelease-r8             RRCConnectionRelease-r8-IEs,
            spare3 NULL, spare2 NULL, spare 1 NULL
        },
        criticalExtensionsFuture            SEQUENCE { }
    }
}
RRCConnectionRelease-r8-IEs:: = SEQUENCE {
    releaseCause                        ReleaseCause,
    redirectedCarrierInfo               RedirectedCarrierInfo    OPTIONAL,    --
    Need ON
    idleModeMobilityControlInfo         IdleModeMobilityControlInfo OPTIONAL, --
    Need OP
    nonCriticalExtension                RRCConnectionRelease-v890-IEs
        OPTIONAL
}
RRCConnectionRelease-v890-IEs := SEQUENCE {
    lateNonCriticalExtension            OCTET STRING (CONTAINING
        RRCConnectionRelease-v9e0-IEs) OPTIONAL,
    nonCriticalExtension                RRCConnectionRelease-v920-IEs
        OPTIONAL
}
-- Late non-critical extensions
RRCConnectionRelease-v9e0-IEs := SEQUENCE {
    redirectedCarrierInfo-v9e0          RedirectedCarrierInfo-v9e0 OPTIONAL, --
    Cond NoRedirect-r8
    idleModeMobilityControlInfo-v9e0  IdleModeMobilityControlInfo-v9e0
        OPTIONAL, -- Cond IdleInfoEUTRA
    nonCriticalExtension                SEQUENCE { }           OPTIONAL
}
-- Regular non-critical extensions
RRCConnectionRelease-v920-IEs:: = SEQUENCE {
    cellInfoList-r9                     CHOICE {
        geran-r9                            CellInfoListGERAN-r9,
        utra-FDD-r9                         CellInfoListUTRA-FDD-r9,
        utra-TDD-r9                         CellInfoListUTRA-TDD-r9,
        ...
        utra-TDD-r10                        CellInfoListUTRA-TDD-r10
    }                                   OPTIONAL, -- Cond
    Redirection
    nonCriticalExtension                RRCConnectionRelease-v1020-IEs OPTIONAL
}
```

-continued

```
RRCConnectionRelease-v1020-IEs :.   = SEQUENCE {
    extendedWaitTime-r10              INTEGER (1.. 1800) OPTIONAL, -- Need ON
    nonCriticalExtension              RRCConnectionRelease-v1320-IEs OPTIONAL
}
RRCConnectionRelease-v1320-IEs::    = SEQUENCE {
    resumeIdentity-r13                ResumeIdentity-r13 OPTIONAL, -- Need OR
    nonCriticalExtension              RRCConnectionRelease-v1530-IE OPTIONAL
}
RRCConnectionRelease-v1530-IEs := SEQUENCE {
    drb-ContinueROHC-r15              ENUMERATED {true}OPTIONAL, --Cond
        UP-EDT
    nextHopChainingCount-r15          NextHopChainingCount OPTIONAL, --Cond
        UP-EDT
    measIdleConfig-r15                MeasIdleConfigDedicated-r15   OPTIONAL,
        --Need ON
    rrc-InactiveConfig-r15            RRC-InactiveConfig-r15
        OPTIONAL, -- Need OR
    cn-Type-r15                       ENUMERATED {epc,fivegc}   OPTIONAL,
        -- Need OR
    nonCriticalExtension              RRCConnectionRelease-v1540-IEs
        OPTIONAL
RRCConnectionRelease-v1540-IEs ::= SEQUENCE {
    waitTime                          INTEGER (1..16) OPTIONAL, -- Cond5GC
    nonCriticalExtension              RRCConnectionRelease-v16xx-IEs
        OPTIONAL
}
RRCConnectionRelease-v16xx-IEs    ::= SEQUENCE {
    releaseMeasIdleReport                ENUMERATED {true}    OPTIONAL, –
    Need ON
        nonCriticalExtension             SEQUENCE {}          OPTIONAL
}
    <<skipped parts>>
--ASN1STOP
```

In an embodiment, the UE resumes/sets up the connection in a cell that does not broadcast an indication in system information that the cell supports idle measurements for early reporting. In one example, if a UE with stored idle mode measurements initiates a resume or establishment procedure in a cell that does not indicate support for idle mode measurements (e.g., with the idleModeMeasurements indication in SIM for LTE), the UE would delete the idle mode measurement. An example of this procedure is shown below for LTE:

```
5.3.3 RRC connection establishment
<<skipped parts>>
5.3.3.2 Initiation
The UE initiates the procedure when upper layers request establishment or resume of an RRC
connection while the UE is in RRC_IDLE or when upper layers request resume of an RRC
connection or RRC layer requests resume of an RRC connection for, e.g. RNAU or reception
of RAN paging while the UE is in RRC_INACTIVE.
    1> except if the SIB2 contains idleModeMeasurements;
        2> clear the VarMeasIdleReport, if stored;
```

A similar procedure in NR (3GPP TS 38.331 v15.5.1) could be, for example:

```
5.3.3 RRC connection establishment
5.3.3.2 Initiation
The UE initiates the procedure when upper layers request establishment of an RRC connection
while the UE is in RRC_IDLE and it has acquired essential system information as described in
5.2.2.1.
The UE shall ensure having valid and up to date essential system information as specified in
clause 5.2.2.2 before initiating this procedure.
Upon initiation of the procedure, the UE shall:
    1> except if the SIBx contains idleModeMeasurements;
        2> clear the VarMeasIdleReport, if stored;
5.3.13 RRC connection resume
<<skipped parts>>
5.3.13.2   Initiation
The UE initiates the procedure when upper layers or AS (when responding to RAN paging or
upon triggering RNA updates while the UE is in RRC_INACTIVE) requests the resume of a
suspended RRC connection.
The UE shall ensure having valid and up to date essential system information as specified in
clause 5.2.2.2 before initiating this procedure.
```

Upon initiation of the procedure, the UE shall:
1> except if the SIBx contains idleModeMeasurements;
  2> clear the VarMeasIdleReport, if stored;

Embodiments described herein introduce methods to delete idle mode measurement results that the network has not requested, even after the UE has entered RRC_CONNECTED. This helps the UE to avoid keeping idle mode measurements indefinitely.

Figure 7:
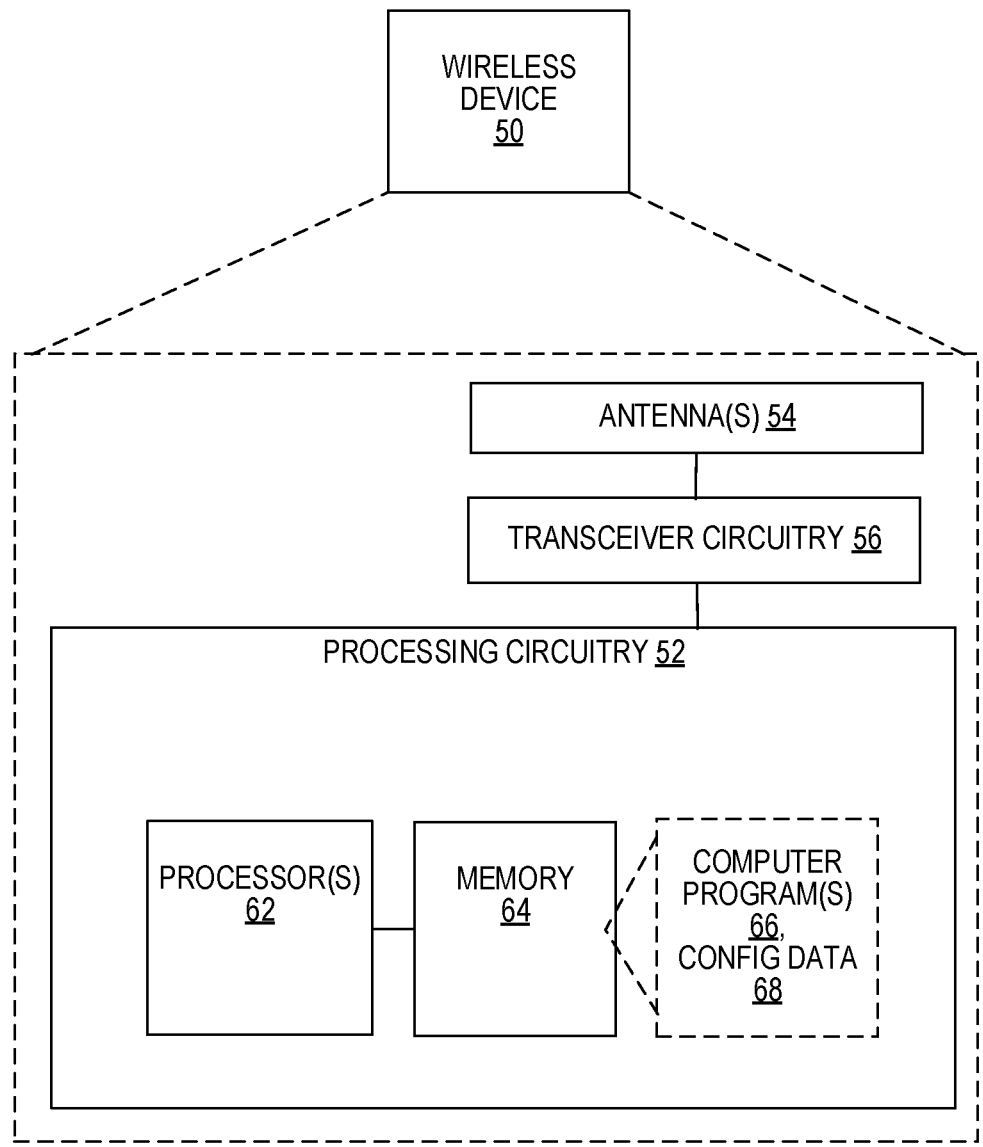
FIG. 7 illustrates is a block diagram of a wireless device, according to some embodiments.

FIG. 7 shows illustrates an example wireless device 50 (e.g., UE) that is configured to perform the techniques described herein for the UE. The wireless device 50 may also be considered to represent any wireless devices that may operate in a network and that are capable of communicating with a network node or another wireless device over radio signals. The wireless device 50 may also be referred to, in various contexts, as a radio communication device, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuit 56. The processing circuit 52 comprises one or more digital processing circuits 62, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the wireless device 50.

Accordingly, in some embodiments, the processing circuit 52 of the wireless device 50 is configured to perform idle mode measurements. The processing circuit 52 is configured to perform and store one or more radio signal measurements while in an idle mode or inactive state, and delete the stored radio signal measurements in response to any one of a number of events. The events include: receiving a RRC release message that does not include an idle mode measurement configuration; receiving an RRC release message while in RRC Connected state; receiving a handover message; receiving a reconfiguration message adding a secondary cell for carrier aggregation; receiving a reconfiguration message modifying a secondary cell for carrier aggregation; receiving a reconfiguration message activating or deactivating a secondary cell for carrier aggregation; receiving a message configuring one or more new connected mode measurements; successfully obtaining one or more connected mode measurements; receiving a message instructing the UE to resume one or more connected mode measurements; entering RRC Connected state and subsequently experiencing a radio link failure, integrity check failure, or reconfiguration failure; entering RRC Connected state and failing to receive a request for reporting of idle mode measurements before expiry of a timer for maintaining idle mode measurements; and resuming or establishing a connection in a cell that does not broadcast an indication that the cell support supports early reporting of idle mode measurements.

Processing circuitry 32 is also configured to perform method 800, according to some embodiments. Method 800, shown in FIG. 8, includes performing and storing one or more radio signal measurements while in an idle mode or inactive state (block 802) and deleting the stored radio signal measurements in response to any one of the events listed above (block 804). The method may include receiving an idle mode measurement configuration from a source cell when entering the idle mode or inactive state, where the performing one or more radio signal measurements is according to the received idle mode measurement configuration. The method may include, prior to deleting the stored radio signal measurements, entering a connected state without being requested to report the idle mode measurements.

Figure 9:
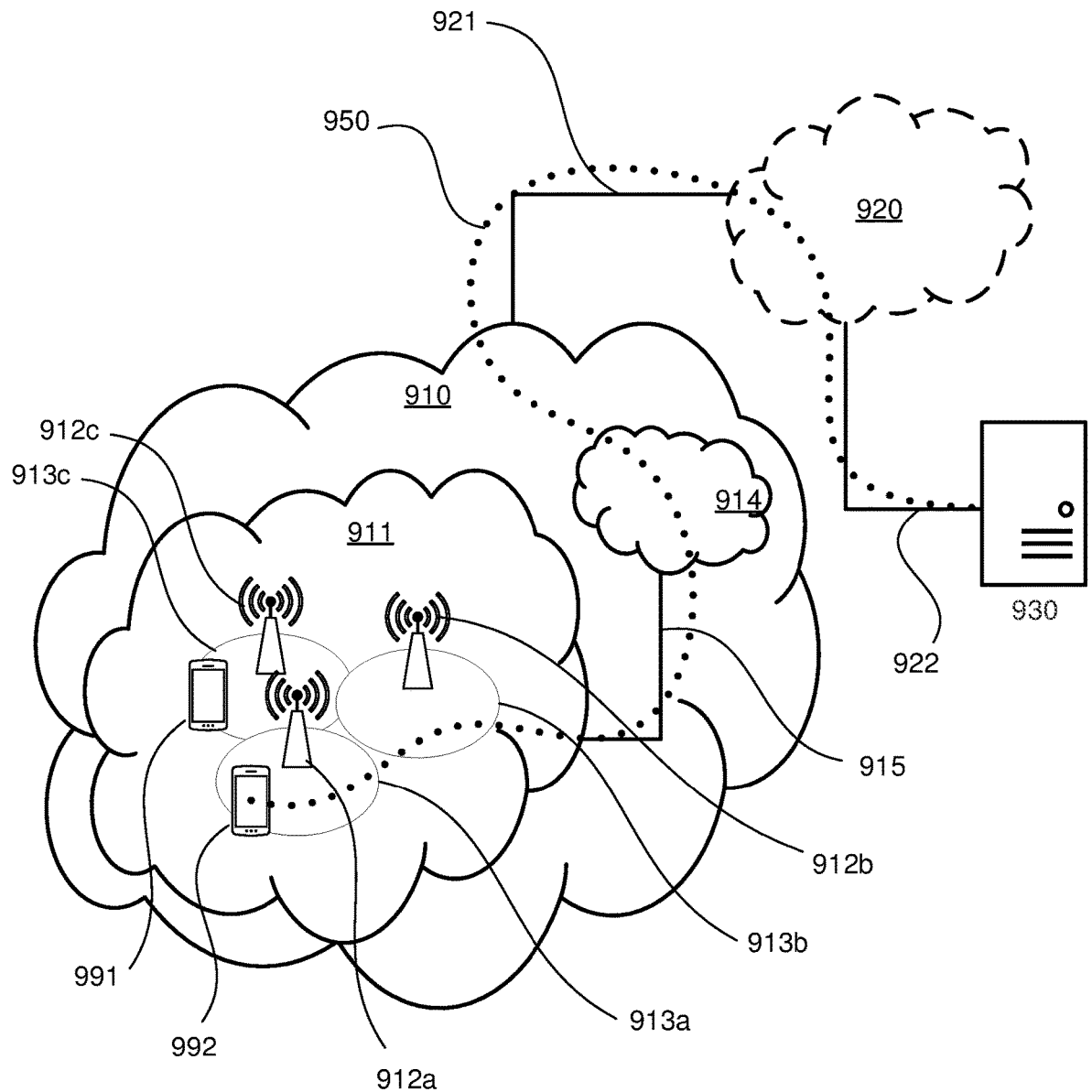
FIG. 9 schematically illustrates a telecommunication network connected via an intermediate network to a host computer, according to some embodiments.

FIG. 9, according to some embodiments, illustrates a communication system that includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 815 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
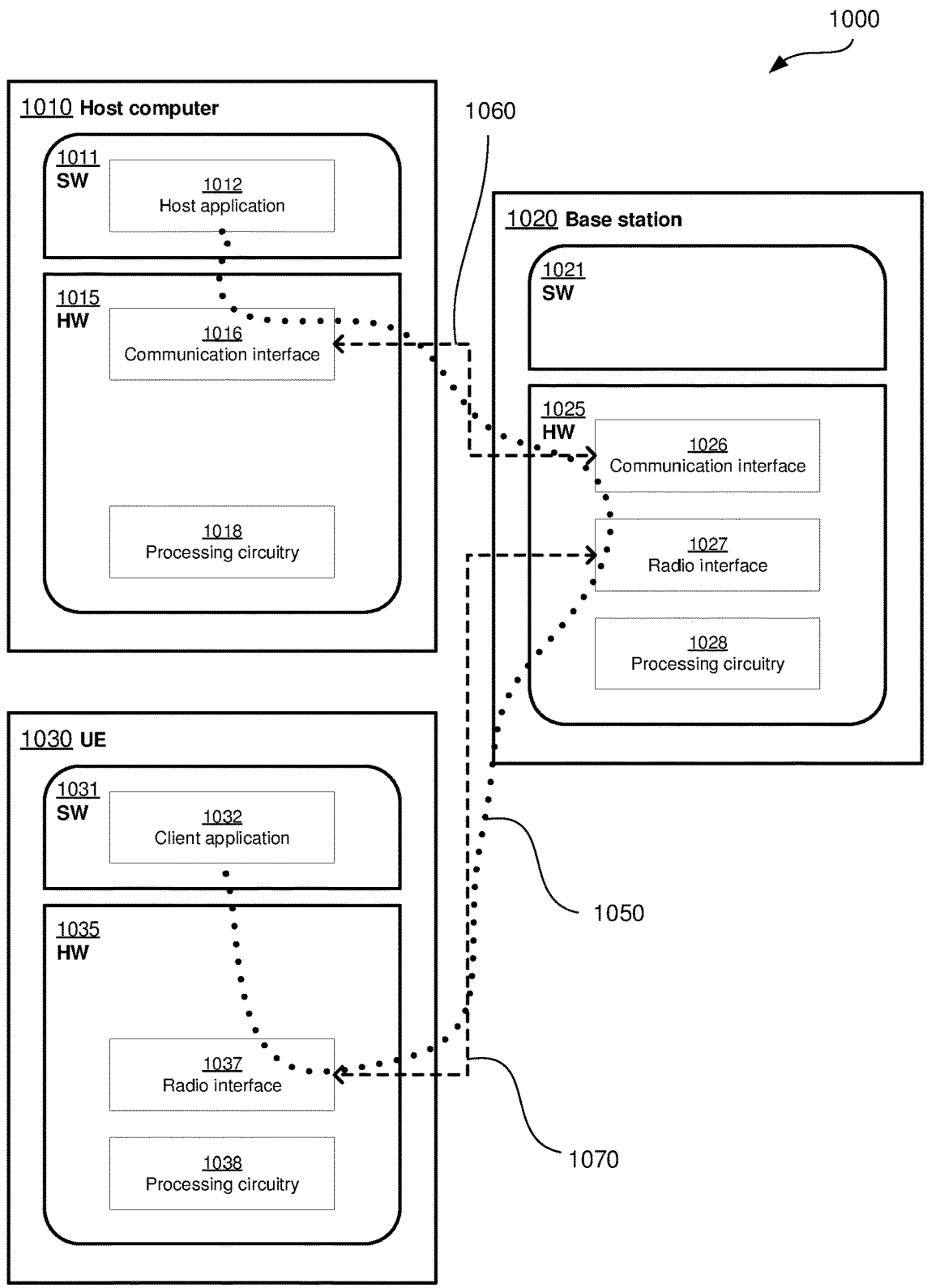
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 1030, one of the base stations 1012a, 1012b, 1012c and one of the UEs 1091, 1092 of FIG. 10, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure, such as provided by nodes such as a wireless device and relay node 30, along with the corresponding method 800. The embodiments described herein provide the deletion of idle mode measurements so that they are not stored indefinitely. The teachings of these embodiments may improve the reliability, connections, data rate, capacity, latency and/or power consumption for the network and UE 1030 using the OTT connection 1050.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
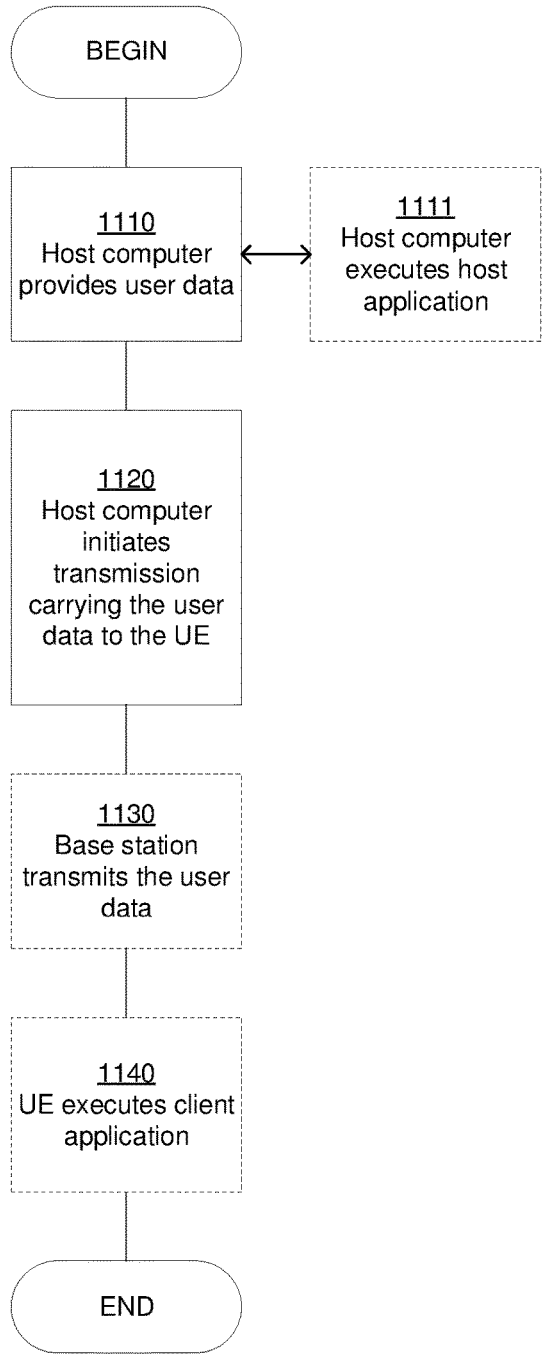

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

Figure 12:
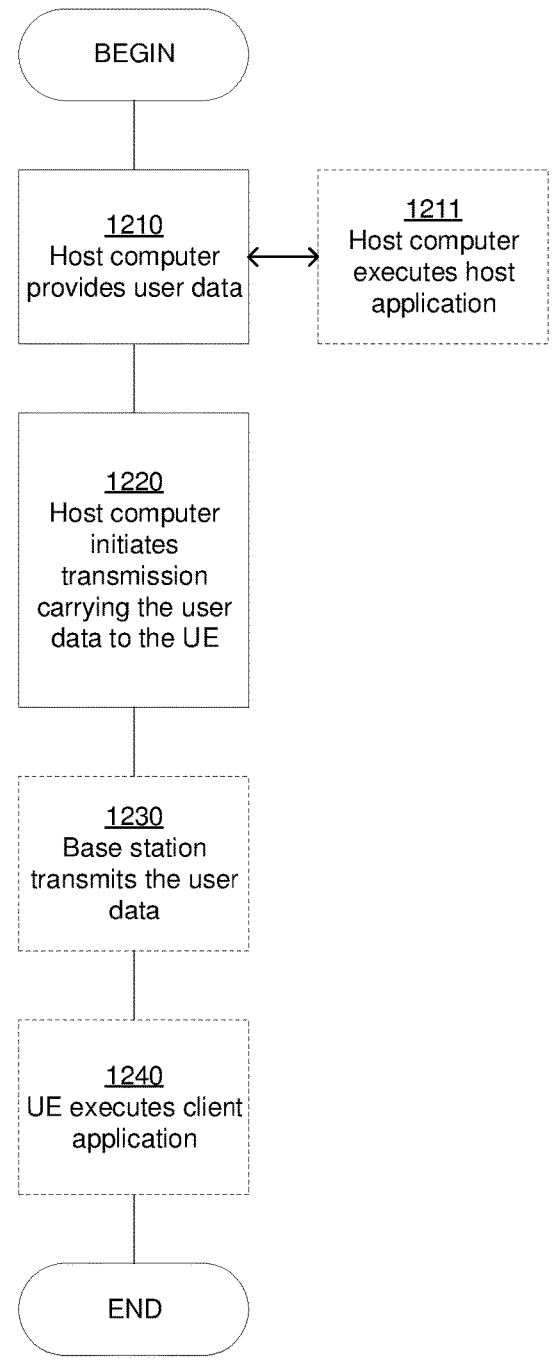

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally, or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

Figure 8:
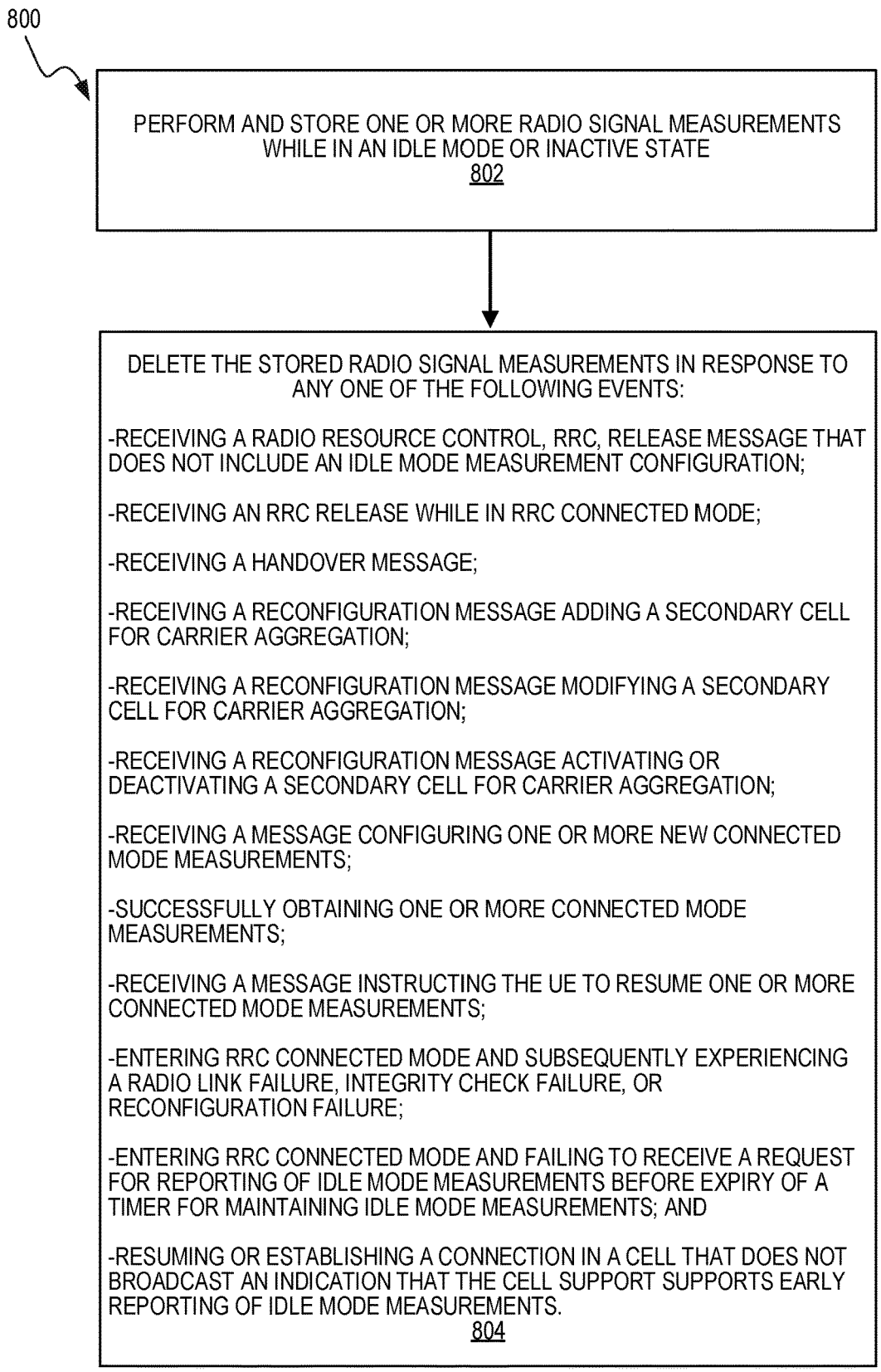
FIG. 8 illustrates a flowchart illustrating a method in the wireless device, according to some embodiments.

As discussed in detail above, the techniques described herein, e.g., as illustrated in the process flow diagram of FIG. 8, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
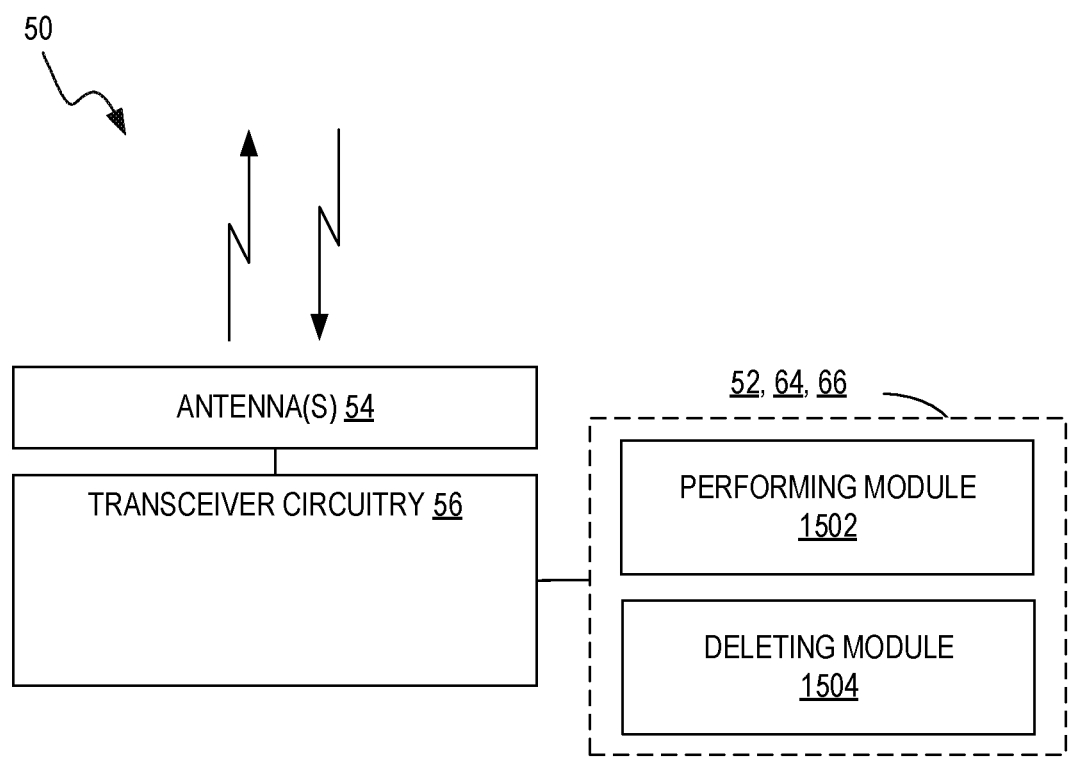
FIG. 15 is a block diagram illustrating a functional implementation of a wireless device, according to some embodiments.

FIG. 15 illustrates an example functional module or circuit architecture for a wireless device 50. The functional implementation includes a performing module 1502 for performing and storing one or more radio signal measurements while in an idle mode or inactive state. The implementation also includes a deleting module 1504 for deleting the stored radio signal measurements in response to any one of the following events: receiving a RRC release message that does not include an idle mode measurement configuration; receiving an RRC release message while in RRC Connected state; receiving a handover message; receiving a reconfiguration message adding a secondary cell for carrier aggregation; receiving a reconfiguration message modifying a secondary cell for carrier aggregation; receiving a reconfiguration message activating or deactivating a secondary cell for carrier aggregation; receiving a message configuring one or more new connected mode measurements; successfully obtaining one or more connected mode measurements; receiving a message instructing the UE to resume one or more connected mode measurements; entering RRC Connected state and subsequently experiencing a radio link failure, integrity check failure, or reconfiguration failure; entering RRC Connected state and failing to receive a request for reporting of idle mode measurements before expiry of a timer for maintaining idle mode measurements; and resuming or establishing a connection in a cell that does not broadcast an indication that the cell support supports early reporting of idle mode measurements.

Example Embodiments

Example embodiments can include, but are not limited to, the following enumerated examples:

1. A method, in a user equipment, UE, adapted to perform idle mode measurements, the method comprising:
 performing and storing one or more radio signal measurements while in an idle mode or inactive state; and
 deleting the stored radio signal measurements in response to any one of the following events:
  receiving a Radio Resource Control, RRC, release message that does not include an idle mode measurement configuration;
  receiving an RRC release while in RRC Connected mode;
  receiving a handover message;
  receiving a reconfiguration message adding a secondary cell for carrier aggregation;
  receiving a reconfiguration message modifying a secondary cell for carrier aggregation;
  receiving a reconfiguration message activating or deactivating a secondary cell for carrier aggregation;
  receiving a message configuring one or more new connected mode measurements;
  successfully obtaining one or more connected mode measurements;
  receiving a message instructing the UE to resume one or more connected mode measurements;
  entering RRC Connected mode and subsequently experiencing a radio link failure, integrity check failure, or reconfiguration failure;
  entering RRC Connected mode and failing to receive a request for reporting of idle mode measurements before expiry of a timer for maintaining idle mode measurements; and
  resuming or establishing a connection in a cell that does not broadcast an indication that the cell support supports early reporting of idle mode measurements.

2. The method of example embodiment 1, further comprising:
 receiving an idle mode measurement configuration from a source cell when entering the idle mode or inactive state, wherein said performing one or more radio signal measurements is according to the received idle mode measurement configuration.

3. The method of example embodiment 1 or 2, wherein the method comprises, prior to said deleting the stored radio signal measurements, entering a connected state without being requested to report the idle mode measurements.

4. A wireless device adapted to perform a method according to any of example embodiments 1-3.

5. A wireless device comprising transceiver circuitry and processing circuitry operatively associated with the transceiver circuitry and configured to perform a method according to any of example embodiments 1-3.

6. A computer program comprising instructions that, when executed on at least one processing circuit, cause the at least one processing circuit to carry out a method according to any one of example embodiments 1-3.

7. A carrier containing the computer program of example embodiment 6, wherein the carrier is one of an electronic signal, optical signal, radio signal, or computer readable storage medium.

A1. A communication system including a host computer comprising:
 processing circuitry configured to provide user data; and
 a communication interface configured to forward the user data to a cellular network for transmission to a user equipment (UE), wherein the cellular network comprises a base station, the UE having a radio interface and processing circuitry, wherein the UE processing circuitry is configured to perform any of the operations comprising embodiments 1-3.

A2. The communication system of the previous embodiment further including the base station.

A3. The communication system of the previous two embodiments, further including the UE, wherein the UE is configured to communicate with the base station.

A4. The communication system of the previous three embodiments, wherein:
 the processing circuitry of the host computer is configured to execute a host application, thereby providing the user data; and
 the UE comprises processing circuitry configured to execute a client application associated with the host application.

A5. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the UE performs any of the steps of any of embodiments 1-3.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A communication system including a host computer comprising a communication interface configured to receive user data originating from a transmission from a User equipment (UE) to a base station, the UE comprising a radio interface and processing circuitry configured to communicate with the base station and cooperatively perform operations of any of embodiments 1-3.

A9. The communication system of the previous embodiment further including the base station.

A10. The communication system of the previous two embodiments, further including the UE, wherein the UE is configured to communicate with the base station.

A11. The communication system of the previous three embodiments, wherein:
 the processing circuitry of the host computer is configured to execute a host application; and
 the UE is further configured to execute a client application associated with the host application, thereby providing the user data to be received by the host computer.

A12. A method implemented in a communication system including a host computer, a base station and a user equipment (UE), the method comprising:
at the host computer, receiving, from the base station, user data originating from a transmission which the base station has received from the UE, wherein the UE performs any of the steps of any of embodiments 1-3.

A13. The method of the previous embodiment, further comprising at the base station, receiving the user data from the UE.

A14. The method of the previous 2 embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method, in a user equipment (UE) adapted to perform idle mode measurements, the method comprising:
performing and storing one or more radio signal measurements while in an idle mode or inactive state; and
deleting the stored radio signal measurements in response to any one of the following events:
entering Radio Resource Control (RRC) Connected state and reporting the stored radio signal measurements in an RRC Resume Complete message;
receiving an RRC release message that does not include an idle mode measurement configuration;
receiving an RRC release message while in RRC Connected state;
receiving a handover message;
successfully obtaining one or more connected mode measurements;
receiving a message instructing the UE to resume one or more connected mode measurements;
entering RRC Connected state and subsequently experiencing a radio link failure, integrity check failure, or reconfiguration failure; and
resuming or establishing a connection in a cell that does not broadcast an indication that the cell supports early reporting of idle mode measurements.

2. The method of claim 1, further comprising:
receiving an idle mode measurement configuration from a source cell when entering the idle mode or inactive state, wherein said performing one or more radio signal measurements is according to the received idle mode measurement configuration.

3. The method of claim 1, wherein the method comprises, prior to said deleting the stored radio signal measurements, entering a connected state without being requested to report the idle mode measurements.

4. The method of claim 1, wherein the stored radio signal measurements are deleted in response to entering RRC Connected state and reporting the stored radio signal measurements in an RRC Resume Complete message, and wherein said deleting is further responsive to receiving an acknowledgment that the measurements were successfully delivered.

5. The method of claim 1, wherein the stored radio signal measurements are deleted in response to successfully obtaining one or more connected mode measurements, and wherein said deleting is further conditioned on the UE successfully obtaining the one or more connected mode measurements in a cell that does not indicate that the cell supports idle measurements for early reporting.

6. A wireless device comprising transceiver circuitry and processing circuitry operatively associated with the transceiver circuitry, wherein the processing circuitry is configured to:
perform and store one or more radio signal measurements while in an idle mode or inactive state; and
delete the stored radio signal measurements in response to any one of the following events:
entering Radio Resource Control (RRC) Connected state and reporting the stored radio signal measurements in an RRC Resume Complete message;
receiving an RRC release message that does not include an idle mode measurement configuration;
receiving an RRC release message while in RRC Connected state;
receiving a handover message;
successfully obtaining one or more connected mode measurements;
receiving a message instructing the UE to resume one or more connected mode measurements;
entering RRC Connected state and subsequently experiencing a radio link failure, integrity check failure, or reconfiguration failure; and
resuming or establishing a connection in a cell that does not broadcast an indication that the cell supports early reporting of idle mode measurements.

7. The wireless device of claim 6, wherein the processing circuitry is further configured to:
receive an idle mode measurement configuration from a source cell when entering the idle mode or inactive state, and
perform the one or more radio signal measurements according to the received idle mode measurement configuration.

8. The wireless device of claim 6, wherein the processing circuitry is configured to, prior to deleting the stored radio signal measurements, enter a connected state without being requested to report the idle mode measurements.

9. The wireless device of claim 6, wherein the processing circuitry is configured to delete stored radio signal measurements in response to entering RRC Connected state and reporting the stored radio signal measurements in an RRC Resume Complete message, and wherein the processing circuitry is configured to delete the stored messages further in response to receiving an acknowledgment that the measurements were successfully delivered.

10. The wireless device of claim 6, wherein the processing circuitry is configured to delete stored radio signal measurements in response to successfully obtaining one or more connected mode measurements, and wherein said the processing circuitry is further configured to condition the deleting on the wireless device successfully obtaining the one or more connected mode measurements in a cell that does not indicate that the cell supports idle measurements for early reporting.

11. A non-transitory computer-readable medium comprising, stored thereupon, a computer program comprising instructions that, when executed on at least one processing circuit, cause the at least one processing circuit to carry out a method according to claim 1.

* * * * *